United States Patent
Amidon et al.

(10) Patent No.: US 7,792,703 B1
(45) Date of Patent: Sep. 7, 2010

(54) METHODS, SYSTEMS, AND COMPUTER READABLE MEDIUM FOR GENERATING WISH LISTS

(75) Inventors: Christopher M. Amidon, Apex, NC (US); Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1002 days.

(21) Appl. No.: 11/359,631

(22) Filed: Feb. 22, 2006

(51) Int. Cl.
*G06Q 30/00* (2006.01)
*G06F 17/30* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,583,763 A | 12/1996 | Atcheson et al. | |
| 5,749,081 A | 5/1998 | Whiteis | |
| 6,064,980 A | 5/2000 | Jacobi et al. | |
| 6,266,649 B1 | 7/2001 | Linden et al. | |
| 6,317,718 B1 * | 11/2001 | Fano | 705/1.1 |
| 6,317,722 B1 | 11/2001 | Jacobi et al. | |
| 6,609,106 B1 * | 8/2003 | Robertson | 705/26 |
| 6,611,814 B1 * | 8/2003 | Lee et al. | 705/26 |
| 6,714,926 B1 | 3/2004 | Benson | |
| 6,853,982 B2 | 2/2005 | Smith et al. | |
| 6,915,128 B1 * | 7/2005 | Oh | 455/424 |
| 6,944,668 B1 | 9/2005 | Broquist et al. | |
| 6,947,900 B2 | 9/2005 | Giordano et al. | |
| 2002/0178072 A1 * | 11/2002 | Gusler et al. | 705/26 |
| 2003/0131021 A1 * | 7/2003 | Wight et al. | 707/200 |
| 2005/0203807 A1 | 9/2005 | Bezos et al. | |

OTHER PUBLICATIONS

"Scanned Goods"(bar codes)(Brief Article). Hardy, Quentin. Forbes. Oct. 30, 2000.*
http://www.ilrt.bris.ac.uk/publications/researchreport/rr1085/report_html?ilrtyear=2004.

* cited by examiner

*Primary Examiner*—Jeffrey A Smith
*Assistant Examiner*—Resha Desai
(74) *Attorney, Agent, or Firm*—Withrow & Terranova, PLLC

(57) ABSTRACT

Methods, systems, and products are disclosed for generating a wish list of items. Wish list data associated with a user is received. The wish list of items is generated from the wish list data. The wish list of items is sent to a third party, and a placement is received. The placement suggests a product or service offered by the third party that matches at least one of the user's wish list of items.

17 Claims, 18 Drawing Sheets

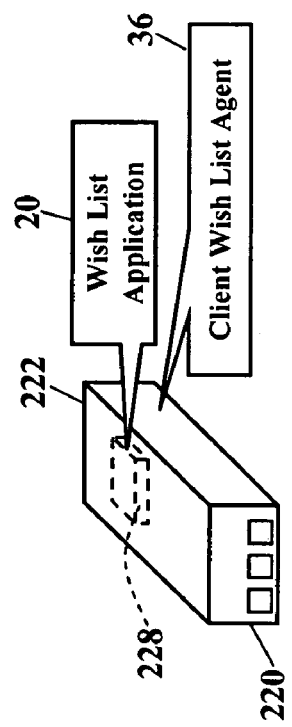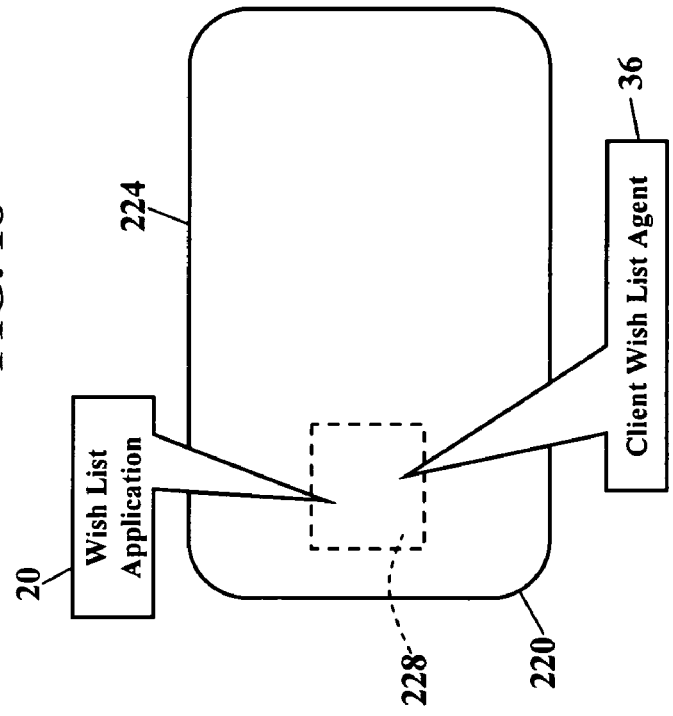

METHODS, SYSTEMS, AND COMPUTER READABLE MEDIUM FOR GENERATING WISH LISTS

BACKGROUND

This application particularly relates to automatically generating a wish list and recommending items to fulfill that wish list.

Gift giving is challenging. Everyone wants to give that great gift, but few people know what to buy. If the gift recipient is not well known, choosing a gift may be frustrating. Even if the gift recipient is a close family member, the gift giver may still have difficulty selecting a gift. Time is also wasted visiting different stores and comparing gift ideas. What is needed, then, are methods, systems, and products that automatically generate a wish list that is tailored to a user.

SUMMARY

The problems noted above, along with other problems, may be reduced or eliminated by embodiments of the present invention using methods, systems, and products that generate a wish list of items. This wish list of items is a collection or listing of products and/or services that may appeal to a user. The wish list of items is generated from any data that may be used, or interpreted, to generate appealing products and services for the user. The wish list of items is based on an intimate understanding of the user. The wish list of items is generated from a broad base of information to understand the current needs of the user. The wish list of items, however, may also predict future needs and trends. Any time the user makes music, movie, and other content selections, for example, the present invention monitors those content selections. Aspects of the present invention then uses those content selections to help generate products and services that may appeal to the user. As the following paragraphs will explain, all types of information, metadata, and/or any other data are collected and analyzed. Any data that may help generate appealing products and services is collected. The data is even collected from all of the user's devices, such as wireless phones, set-top boxes, personal digital assistants, and other wired and wireless devices. If the user, for example, frequently watches NOVA® and other science programming, the present invention may suggest books, DVDs, and other products related to those science programs. If the user makes gardening purchases, the present invention may suggest gardening tools, plants, and other horticultural products and services. Aspects of the present invention, therefore, generate a collection of products or services, or wish list of items, that may appeal to the user. That wish list of items may then be provided to family, friends, and even others.

According to another aspect, a method is disclosed for generating a wish list of items. One such method receives wish list data associated with a user. The wish list of items is generated from the wish list data. The wish list of items is sent to a third party, and a placement is received. The placement suggests a product or service offered by the third party that matches at least one of the user's wish list of items.

According to another aspect of the present invention, a system generates a wish list of items. A wish list application is stored in memory, and a processor communicates with the memory. The system receives wish list data associated with a user. The system generates the wish list of items from the wish list data. The system sends the wish list of items to a third party and receives a placement from the third party. The placement suggests a product or service offered by the third party that matches at least one of the user's wish list of items.

In yet another aspect, a computer program product generates a wish list of items. The computer program product comprises a computer-readable medium storing computer-readable instructions. These instructions cause receipt of wish list data associated with a user. The wish list of items is generated from the wish list data. The wish list of items is sent to a third party, and a placement is received. The placement suggests a product or service offered by the third party that matches at least one of the user's wish list of items Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

FIGS. 15-19 are schematics further illustrating various communications devices for generating wish lists.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
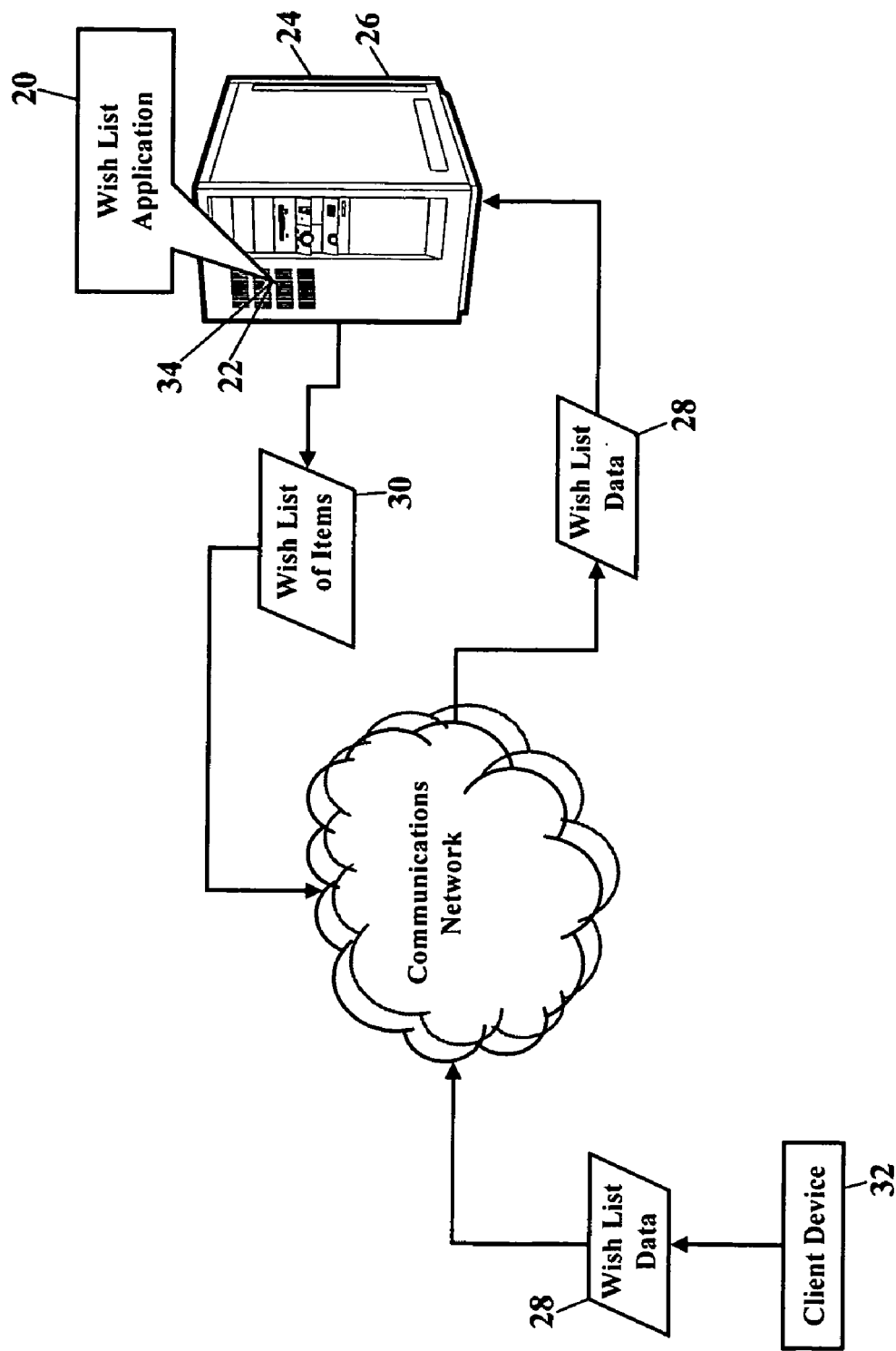
FIG. 1 is a block diagram of a network environment in which the present invention may be implemented.

FIG. 1 is a simplified schematic illustrating a network environment in which exemplary embodiments of the present invention may be implemented. The wish list application 20 is a set of processor-executable instructions that are stored in memory 22 of a communications device 24. Although the communications device 24 is shown as a computer server 26, the communications device 24, as will be later explained, may be any computer, personal digital assistant (PDA), a cordless/cellular/IP phone, or any other processor-controlled device. Whatever the communications device 24, the wish list application 20 collects, receives, retrieves, and/or monitors for wish list data 28. The wish list data 28, in simple terms, is any data that may be used, or interpreted, to generate a wish list 30 of items. The wish list 30 of items is a collection or listing of products or services that may appeal to a user. Suppose, for example, the wish list data 28 is obtained from a user's client device 32. As the user acquires, uses, and/or selects content (such as music, movies, and pictures), for example, the wish list application 20 collects the wish list data 28 that describes those content selections. The wish list application 20 then uses that wish list data 28 to help generate the wish list 30 of items. The wish list application 20 instructs a processor 34 to analyze the wish list data 28 and, based at least in part on the user's content, suggest products or services that may appeal to the user. The wish list 30 of items is thus an electronic collection of products or services that may appeal to the user.

Figure 2:
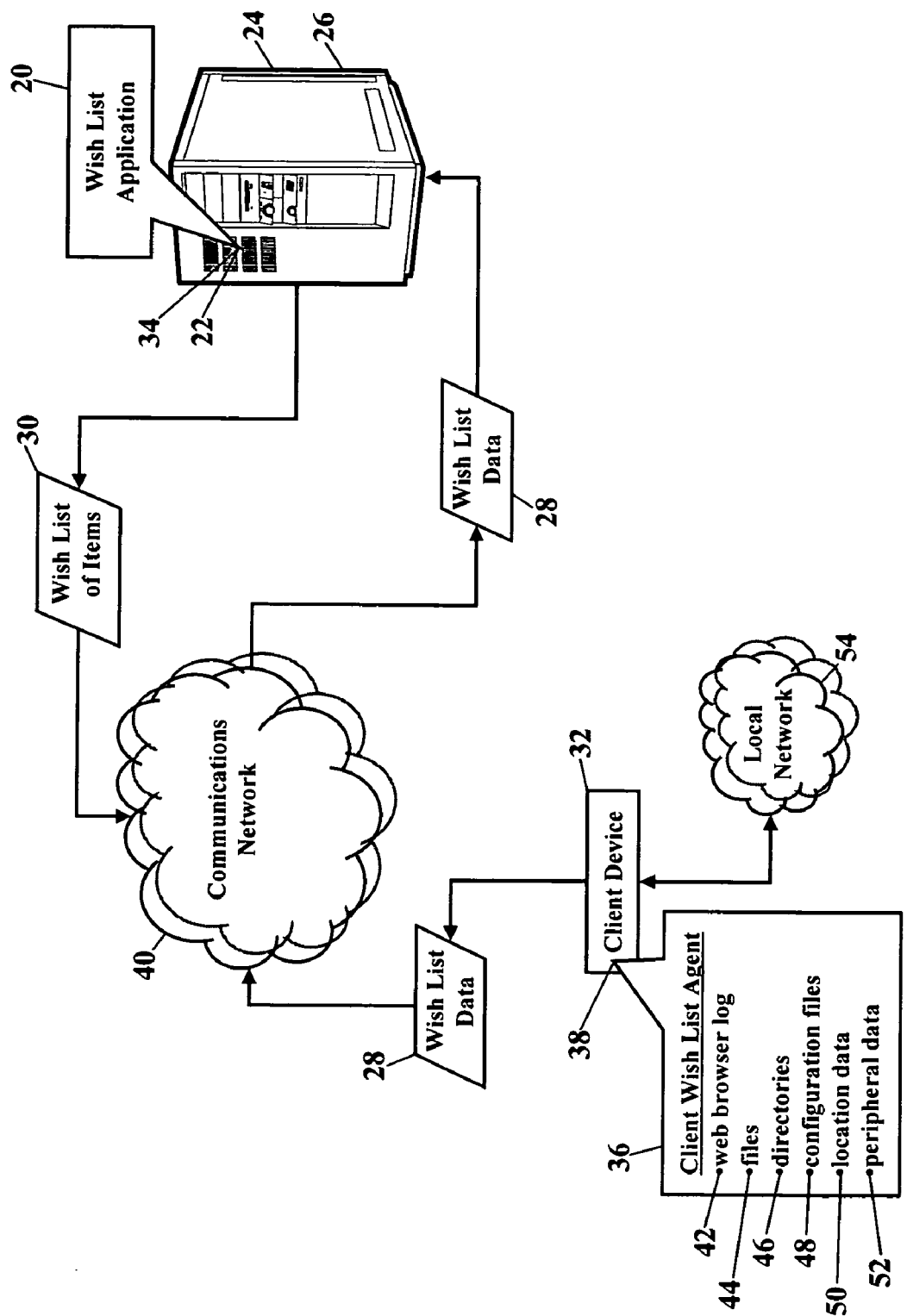
FIGS. 2 and 3 are schematics illustrating a wish list application.

FIG. 2 is a more detailed schematic illustrating the wish list application 20. The wish list application 20 is again shown operating within the computer server 26. Here, however, the wish list application 20 cooperates with a client wish list agent 36. The client wish list agent 36 is a client-side set of processor-executable instructions that are stored in memory 38 of the user's client device 32. The client wish list agent 36 locally collects the wish list data 28 and sends that wish list data 28 via a communications network 40 to the wish list application 20. Because some aspects of wish lists are known, this disclosure will not greatly explain the known details. If the reader desires more details, the reader is invited to consult the following sources, all incorporated herein by reference in their entirety: U.S. Pat. No. 6,947,900 to Giordino III et al. (Sep. 20, 2005); U.S. Pat. No. 6,944,668 to Broquist et al. (Sep. 15, 2005); U.S. Pat. No. 6,853,982 to Smith et al. (Feb. 8, 2005); U.S. Pat. No. 6,714,926 to Benson (Mar. 30, 2004); U.S. Pat. No. 6,317,722 to Jacobi et al. (Nov. 13, 2001); U.S. Pat. No. 6,266,649 to Linden et al. (Jul. 24, 1002); U.S. Pat. No. 6,064,980 to Jacobi et al. (May 16, 2000); U.S. Pat. No. 5,583,763 to Atcheson et al. (Dec. 10, 1996); U.S. Pat. No. 5,749,081 to Whiteis (May 5, 1998); and Published U.S. Patent Application 2005/0203807 to Bezos et al. (Sep. 15, 2005).

The wish list data 28 may be any data. The client wish list agent 36 may periodically or continually scan the user's client device 32 for any data that may be useful in generating the wish list 30 of items. FIG. 2, for example, illustrates the client wish list agent 36 obtaining data from a web browser log 42. The web browser log 42 may store information, metadata, and/or other data describing websites and other links that may help generate products or services that may appeal to the user. The client wish list agent 36 may also obtain information, metadata, and/or other data from any files 44 and directories 46 within the memory 36 of the user's client device 32. These files 44 and directories 46 may store music, movies, images/pictures, and other content that may help generate appealing products or services. The client wish list agent 36 may also obtain information, metadata, and/or other data from device and software configuration files 48. These configuration files 48 may be used to obtain specifications, features, and characteristics of the user's client device 32. If the client wish list agent 36 can identify the user's client device 32, and identify its processing, display, and other hardware, software, and peripheral capabilities, then the configuration files 48 may also help generate appealing products or services.

The wish list data 28 may also include location data 50. The location data 50 is any information, metadata, and/or other data that has a location characteristic. The location data 50, for example, may describe triangulation or GPS coordinates of the user's client device 32. The location data 50 may even include past or historical location information representing previous locations of the user's client device 32. The wish list application 20 may use the location data 50 to recommend products and/or services that are relevant to a current or past location. Suppose, for example, the location data 50 indicates the user's client device 32 is currently located in Yankee Stadium. The wish list application 20 may use the location data 50 to recommend baseball-related products and services that may interest the user. Because the user's client device 32 is currently located in Yankee Stadium, the wish list application 20 may especially recommend officially licensed NEW YORK YANKEES® apparel, products, and memorabilia.

The client wish list agent 36 may even collect peripheral data 52: This peripheral data 52 may describe peripheral devices attaching to, or networked with, the user's client device 32. The peripheral data 52, for example, may describe the characteristics of an external hard drive, printer, display or other component that is connected to the user's client device 32. The peripheral data 52 may also describe other devices and components that are communicatively reachable via a local network 54. When, for example, the user's client device 32 has a network connection to a personal video or digital recorder, the peripheral data 52 may describe the configuration and memory contents of that recorder. Whatever devices are networked to the user's client device 32, the peripheral data 52 may describe any information, metadata, and/or other data obtainable from those networked devices.

The client wish list agent 36 is also configurable. The user may configure the client wish list agent 36 to establish preferences, permissions, priorities, authorizations, schedules, weightings, and other features. The user, for example, may establish a schedule to determine when the client wish list agent 36 inventories the client device 32 for the wish list data 28. The user may schedule a scan for wish list data 28 on an hourly, daily, weekly, or monthly schedule. The user, in fact, may schedule any day, time, or date that is desired. The user may also configure the client wish list agent 36 to permit or deny access to the web browser log 42. The user may even prevent the client wish list agent 36 from gathering wish list data 28 from certain websites, server destinations, devices, or memory locations. The user may configure the client wish list agent 36 to ignore and/or not gather data from any site the user wishes, such as banking sites or sites containing sensitive or potentially embarrassing content. The user may configure the files 44 and directories 46 to which the client wish list agent 36 has access. The user, again, may have personal music, movies, images/pictures, and other content that should not be accessed. The user may configure the client wish list agent 36 to not obtain data from a particular device and/or its configuration files 48. The user, likewise, may not want some or all of the location data 50 or the peripheral data 52 to be collected. The user may thus configure the client wish list agent 36 to establish data permissions. The user may also configure the client wish list agent 36 to weight certain wish list data. The user may wish that some wish list data have more influence than other wish list data. The user, then, may assign weighting factors to different portions of the wish list data 28, such that those portions with larger weights have greater influence.

Figure 3:
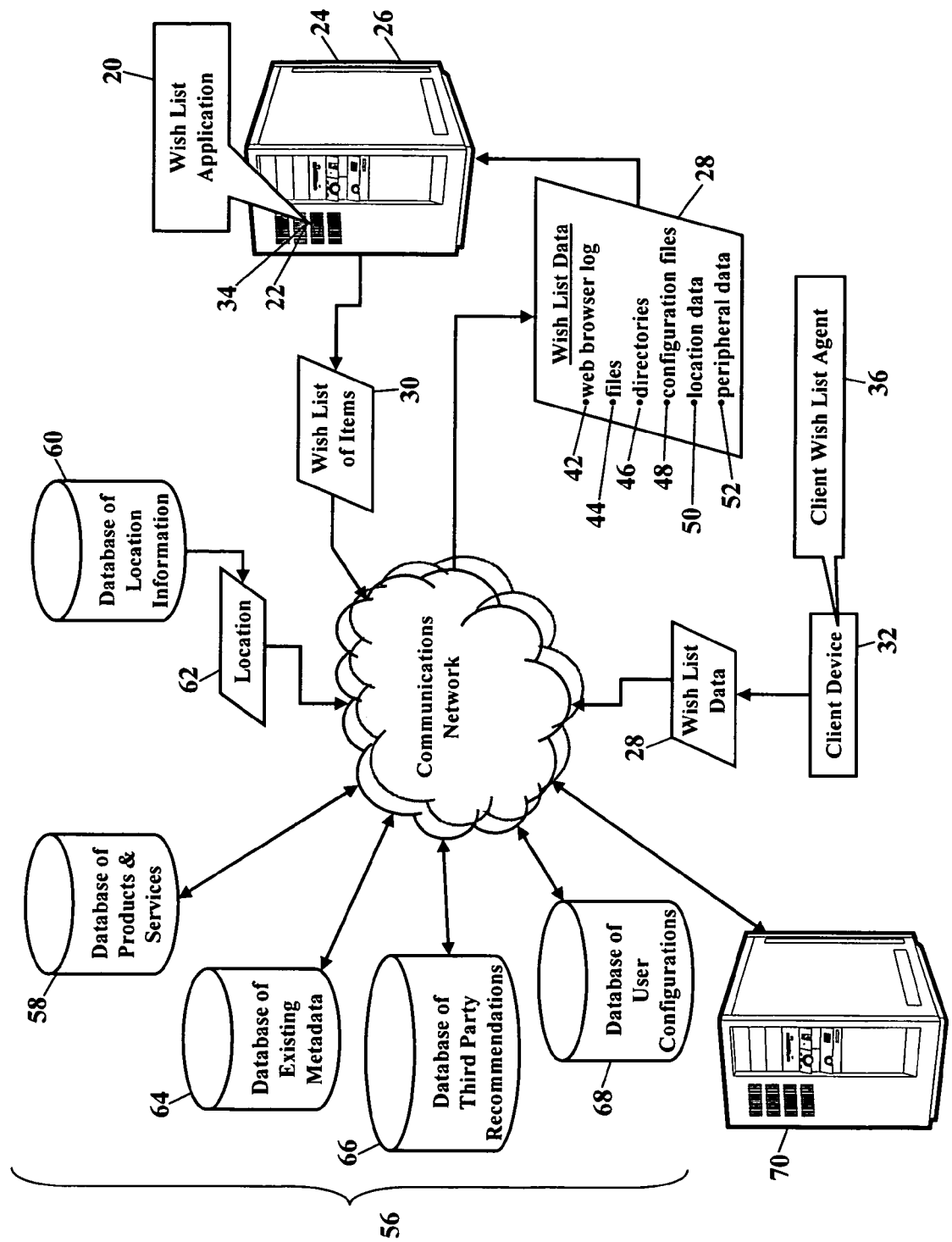

FIG. 3 is another detailed schematic illustrating the wish list application 20. Whatever the wish list data 28, the client wish list agent 36 communicates the wish list data 28 to the wish list application 20. When the wish list application 20 receives the wish list data 28, the wish list application 20 then generates or updates the user's wish list 30 of items. The wish list application 20 compares the wish list data 28 to one or more databases 56. The wish list application 20, for example, compares the wish list data 28 to a database 58 of products and services. The database 58 of products and services contains some mapping, ontology, or relation between the wish list data 28 and products and services. Suppose the wish list data 28 includes metadata that indicates the user frequently receives/watches classic western movies. The wish list application 20, then, queries the database 58 of products and services for the subject of "classic western movies." The database 58 of products and services then returns a response describing those products and/or services having a relationship to "classic western movies." Perhaps the response includes Clint Eastwood and/or John Wayne memorabilia, movie posters, or western wear. The wish list application 20 may then add some or all of those related products or services to the user's wish list 30 of items. Because the wish list data 28 may be diverse, the wish list application 20 may need to consult several databases of products and services. Each different database of products and services may relate different subject matter topics to products and services.

The wish list application 20 may also consult a database 60 of location information. The wish list data 28, as earlier described, may include the location data 50. The location data 50 describes some current and/or historical location characteristic associated with the user's client device 32. The location data 50, for example, may describe triangulation or GPS coordinates of the user's client device 32. The wish list application 20 may then query the database 60 of location information for a current and/or historical location 62 associated with the location data 50. The location 62 may represent a current or real-time location for the user's client device 32. Suppose the database 60 of location information sends a response indicating the user's client device 32 is currently located in Yankee Stadium. The wish list application 20 may then query the database 58 of products and services for the subject of "Yankee Stadium." The database 58 of products and services may then return a response describing products and/or services having a relationship to "Yankee Stadium."

The database 60 of location information may contain location-related product and service placements. When the wish list application 20 queries the database 60 of location information for the location 62, the database 60 of location information may also return related products and services. That is, not only does the database 60 of location information return a response indicating the user's client device 32 is currently located in Yankee Stadium, but the database 60 of location information may also return officially licensed NEW YORK YANKEES® product placements, such as apparel, products, and memorabilia.

The database 60 of location information may be populated with third party sponsors. That is, third parties who want their products and services associated with a particular location may sponsor the database 60 of location information. George Steinbrenner, for example, may decide that his baseball franchise shall agree to at least co-sponsor the database 60 of location information. Whenever someone's location data 50 indicates that they are located near or within Yankee Stadium, then THE NEW YORK YANKEES® baseball franchise has the right to determine what products and services are associated with the Yankee Stadium location. Likewise, TARGET® may sponsor the locations of each of their stores. Whenever someone's location data 50 indicates that they are within the vicinity of a TARGET® store, then TARGET® has the right to have their products and services associated with that location. If a user's location data 50 indicates that they are within the vicinity of a TARGET® store, a WAL-MART® store, and a SEARS® store, then a sponsorship agreement may specify which retailer's products and services take precedence.

The wish list application 20 may also consult a database 64 of existing metadata. The database 64 of existing metadata stores current and/or historical metadata collected from other users. Many users may make similar content selections. Many users, for example, may make similar content selections that are related to NASCAR®, baseball, news, and other popular subject matter. Because some subject matter may be popular amongst multiple users, the metadata associated with that popular subject matter may be saved for quicker analysis. The database 64 of existing metadata, for example, may collect and maintain some or all metadata related to a "top ten" list of subjects. As a group or population of users makes content selections, the database 64 of existing metadata collects and groups metadata. The database 64 of existing metadata may then map this "top ten" metadata to any information or products or services related to that metadata. The database 64 of existing metadata, therefore, may represent a quicker and more efficient method of generating the wish list 30 of items.

The wish list application 20 may also consult a database 66 of third party recommendations. The database 66 of third party recommendations is another database that relates the wish list data 28 to products and/or services. The wish list application 20 queries the database 66 of third party recommendations for some or all of the wish list data 28. The database 66 of third party recommendations contains some mapping, ontology, or relation between subject matter topics and products and services. Here, however, the products and services may be sponsored by third parties. That is, third parties who want their products and services associated with a particular type of wish list data may sponsor the database 66 of third party recommendations. The database 66 of third party recommendations, then, returns a third party's products or services that are related to the query. If the wish list application 20 queries the database 66 of third party recommendations for "tools," then LOWES® may want to sponsor any products related to "tools." A sponsorship agreement may again specify how multiple, competing third parties (such as HOME DEPOT®, LOWES®, or SEARS®) have their respective products and services featured in the database 66 of third party recommendations.

The wish list application 20 may also consult a database 68 of user configurations. The database 68 of user configurations is another database that relates the wish list data 28 to products and/or services. Recall that the wish list data 28 may comprise information, metadata, and/or other data from device and software configuration files 48. This configuration data 42 describes specifications, features, and characteristics of the user's client device 32. The database 68 of user configurations, then, relates the wish list data 28 to products and/or services. If the wish list application 20 can identify the user's client device 32, and perhaps identify its processing, display, and other hardware, software, and peripheral capabilities, then the wish list application 20 may generate products or services that appeal to the user. Suppose, for example, the wish list data 28 indicates that the user has fifty gigabytes (50 GB) of photos, but the user's client device 32 does not have access to an external hard drive. The wish list application 20 may then generate a recommendation for an external hard drive. The wish list data 28 may also indicate that those photos are of a very high resolution, but no imaging software is detected. The wish list application 20 may then generate a recommendation for imaging software. If the user has old or outdated hardware (such as an old IPOD® model), the wish list application 20 may recommend a newer model.

The wish list application 20 then generates the wish list 30 of items. The wish list application 20 receives the user's wish list data 28 and queries one or more of the databases 56. The wish list application 20 causes the processor 34 to use well known data mining techniques to generate the wish list 30 of items. The wish list application 20 utilizes any or all of the wish list data 28 at its disposal. The wish list application 20 thus generates a wish list that is tailored to the user's interests, needs, or desires, based on any or all of the wish list data 28. After the wish list application 20 generates the wish list 30 of items, the wish list application 20 may then send or communicate that wish list 30 of items to any destination address. The wish list 30 of items, for example, may be communicated to the user at the user's client device 32. The wish list 30 of items may additionally or alternatively be communicated to another communications device associated with the user. The wish list 30 of items may additionally or alternatively be communicated to friends, family, or any other authorized party as suggestions for gift-giving occasions. The wish list application 20 may even send the wish list 30 of items to a web server 70 for posting as a web page. The wish list application 20 thus generates real-time, and even location specific, gift ideas for the user.

Figure 4:
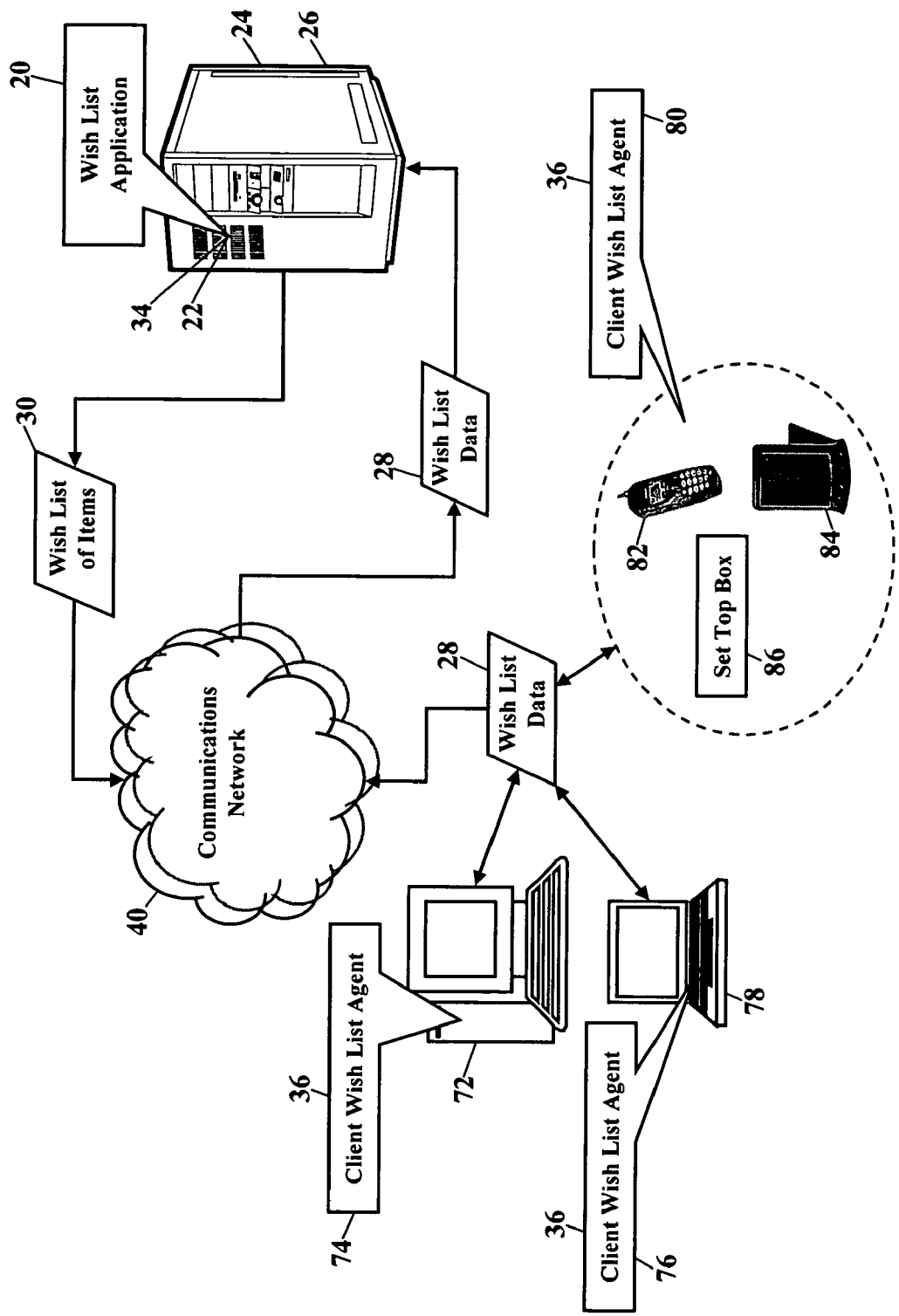
FIG. 4 is a schematic illustrating another operating environment.

FIG. 4 is another schematic illustrating an operating environment. The wish list application 20 is again shown operating within the computer server 26. Here, however, the wish list application 20 cooperates with multiple instances of the client wish list agent 36. The client wish list agent 36 may operate within various communications devices associated with the user. The user, for example, may have a desktop personal computer 72. A first instance 74 of the client wish list agent 36 collects the wish list data 28 from this desktop personal computer 72. A second instance 76 of the client wish list agent 36 may collect wish list data 28 from a laptop computer 78. Other instances 80 of the client wish list agent 36 may collect wish list data 28 from a wireless phone 82, a personal digital assistant 84, and a set-top box 86. The client wish list agent 36 may have other instances that operate and collect wish list data from any communications device. Other instances of the client wish list agent 36 may operate in the user's automobile, boat, airplane, or other vehicle. Other instances of the client wish list agent 36 may operate in household appliances, such as a refrigerator, washing machine, or any others. All these instances of the client wish list agent 36 collect wish list data from their respective host communications device, vehicle, or appliance. All these instances of the client wish list agent 36 then send their wish list data 28 via the communications network 38 to the wish list application 20. The wish list application 20 then generates the wish list 30 of items, as the above paragraphs explained. Here, then, the wish list 30 of items reflects data obtained from any or all of the user's communications devices, vehicles, and appliances.

The user may also establish weightings for the multiple communications devices, vehicles, and appliances. The user may wish that some devices, vehicles, or appliances have more influence than others. The user, for example, may want the desktop personal computer 72 to have more influence than the user's boat or toaster oven. The user, then, may assign weighting factors to each device, vehicle, and appliance, such that the larger weights have greater influence. The user may even establish rules and/or conditions that favor, or disregard, some devices.

Figure 5:
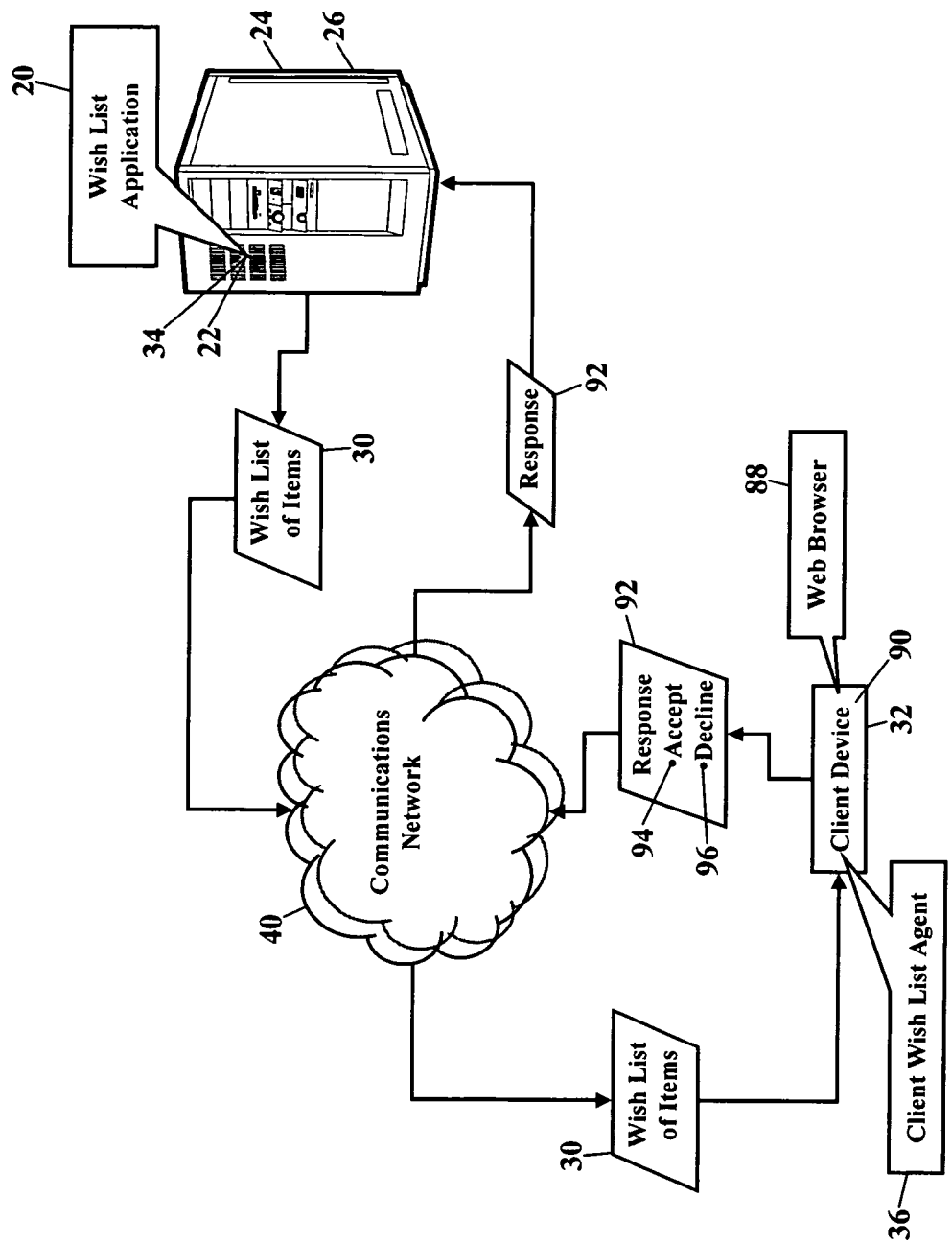
FIG. 5 is a schematic illustrating user review of a wish list of items.

FIG. 5 is a schematic illustrating user review of the wish list 30 of items. Here, when the wish list application 20 generates the wish list 30 of items, the wish list application 20 sends the wish list 30 of items to the user. The user is thus given an opportunity to review the generated wish list 30 of items. The user may thus accept, or decline, any product or service in the wish list 30 of items. FIG. 5, for example, illustrates the wish list application 20 returning the wish list 30 of items to the client wish list agent 36. The wish list 30 of items is addressed to the user's client device 32 and communicates via the communications network 40. The user may then invoke a web browser 88 or other program to visually or audibly present the wish list 30 of items. As the user reviews the wish list 30 of items, the user may approve, or decline, any product or service recommendations. The client wish list agent 36 then instructs a client processor 90 to send a response 92 to the wish list application 20. The response 92 includes any request to approve 94 and/or decline 96 a recommended product or service. The response 92 communicates via the communications network 40 to the computer server 26. When the wish list application 20 receives the response 92, the wish list application 20 instructs the processor 34 to act on any request to approve 94 and/or decline 96 a recommended product or service. The wish list application 20 also includes logic, programming, and/or code that influences future updates to the wish list 30 of items. That is, if the user declines a recommended product or service, then the wish list application 20 may mark or tag that product or service to indicate the declination 96. The wish list application 20, therefore, may give the user an opportunity to say "no thanks" to recommendations, and the wish list application 20 will refrain from future recommendations of the product/service. The user may not like a recommendation, or the user may already have a suggested item. Whatever the reason, wish list application 20 may use the response 92 to influence future updates to the wish list 30 of items.

The wish list application 20 may also accept manual entry. As the user reviews the wish list 30 of items, the user may want to manually add, delete, and/or prioritize items. As the user reviews the wish list 30 of items, the user may prioritize the items. If the user prioritizes any item(s), the wish list application 20 may then consider that prioritization in future updates or generations. The user may also want to manually edit the wish list 30 of items and input desired product details or specifications. Suppose, for example, the wish list application 20 generates a recommended suggestion for a cordless drill. When the user reviews the wish list 30 of items, the user may desire that the cordless drill have a certain voltage, chuck design, or even manufacturer. The user, then, may manually edit the wish list 30 of items to specify these product details. The wish list application 20 may even provide options to input product details, and the wish list application 20 may prompt the user for such product/service details. The wish list application 20, for example, could prompt for manufacturer, model number, color(s), and other features and/or specification. Those manual edits are also included in the response 92. The wish list application 20, therefore, may accept manual entries from a keyboard, mouse, or other tactile input device. The wish list application 20 may even have voice recognition capabilities. Whatever the input method or device, the user may thus manually refine the wish list 30 of items.

The user may also add photos to the wish list 30 of items. As the user reviews the wish list 30 of items, the user may want to add a photo to accompany the wish list. The user, for example, may want to add a photo of a recommended item. When the wish list application 20 generates a recommendation for the cordless drill, the user may wish to add a picture of the exact drill that is desired. The user, then, may add a photo of that desired drill to the wish list 30 of items. The user, for example, may cut-and-paste the picture from the manufacturer's website or from an e-commerce website. The user, however, may also add a picture taken from a communications device. A camera phone, for example, may be used to capture the picture and download that picture to the wish list 30 of items. The user takes a photo of the product or service to be added to the wish list 30 of items. The user, as above explained, may input desired product details or specifications. The user then sends that photo to a designated destination (such as a server, email address, or the wish list application 20). The wish list application 20 receives the photo and adds the photo to the user's wish list 30 of items. The wish list application 20 may even extract location information (and any other information) from the photo image.

Figure 6:
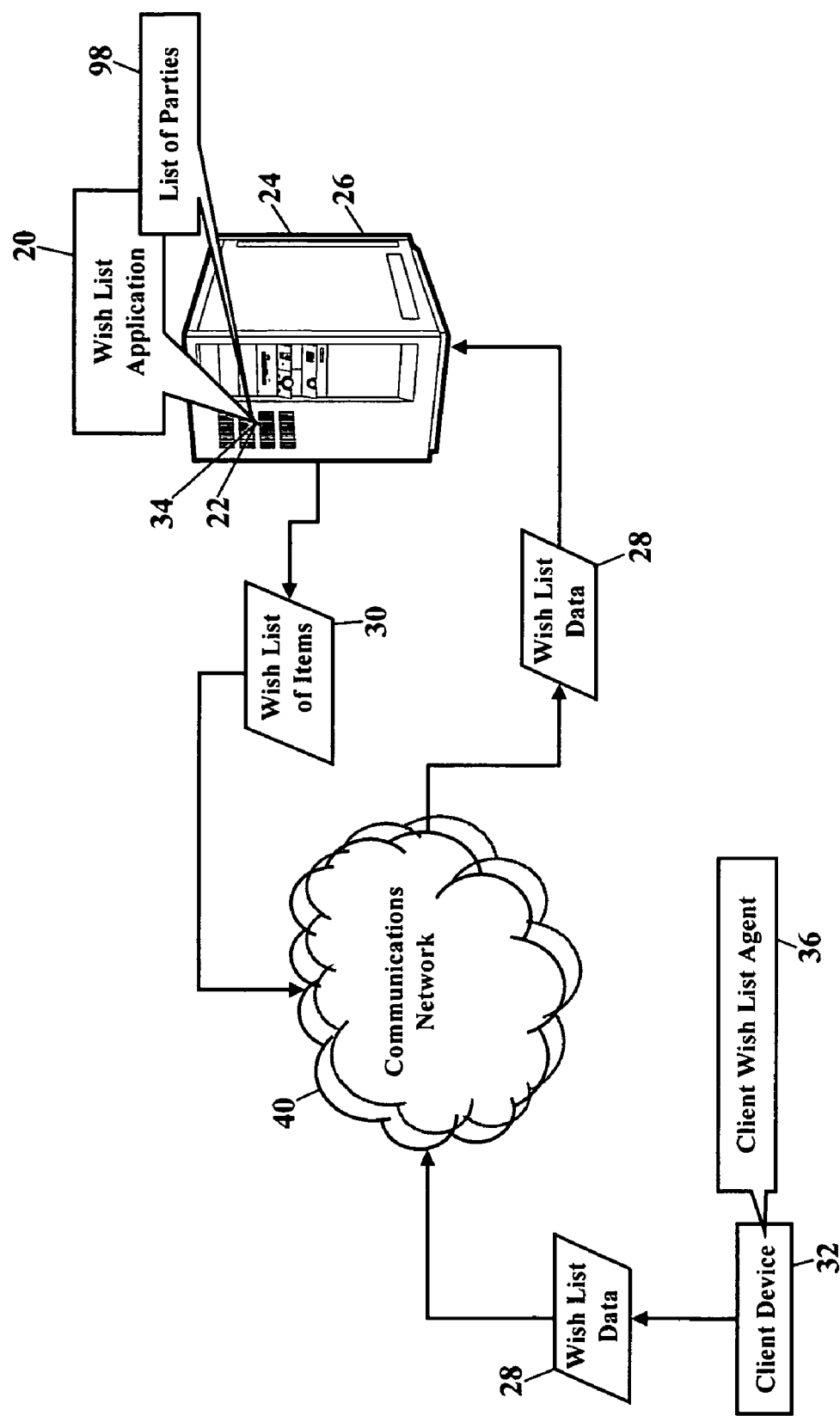
FIG. 6 is a schematic illustrating approved parties that may receive the wish list of items.

FIG. 6 is a schematic illustrating approved parties that may receive the wish list 30 of items, according to more aspects of the present invention. Here, when the wish list application 20 generates the wish list 30 of items, the wish list application 20 accesses a list 98 of parties that are authorized to receive the wish list 30 of items. The wish list 30 of items, as earlier explained, may be communicated to friends, family, or any other party as suggestions for gift-giving occasions. The user's wish list 30 of items may even be communicated to third party retailers or e-commerce websites. Here, then, the list 98 of parties contains those address destinations, address domains, or names that are approved or authorized to receive the user's wish list 30 of items. Before the wish list application 20 sends the wish list 30 of items, the wish list application 20 may first access the list 98 of parties. If a party is listed in the list 98 of parties, then the wish list application 20 has authority to communicate the wish list 30 of items to that party. If a party is not listed in the list 98 of parties, then the wish list application 20 may decline, or be forbidden, to send the user's wish list 30 of items to that party. If a party is not listed in the list 98 of parties, then the wish list application 20 may prompt the user, at the user's client device 32, for permission to communicate the wish list 30 of items. The wish list application 20 may even have logic, programming, or code to autonomously select a party from the list 98 of parties. Those of ordinary skill in the art will recognize that the list 98 of parties may include any information that may be used to identify an authorized party, including names, addresses, identifying numbers, codes, nicknames, and telephone numbers. The list 98 of parties may be at least partially obtained from a personal address book, from calendar entries, directories, contact lists, websites, or any other source. Those of ordinary skill in the art will also recognize that the list 98 of parties may be locally stored in the memory 22 or remotely stored and accessible via the communications network 40.

Figure 7:
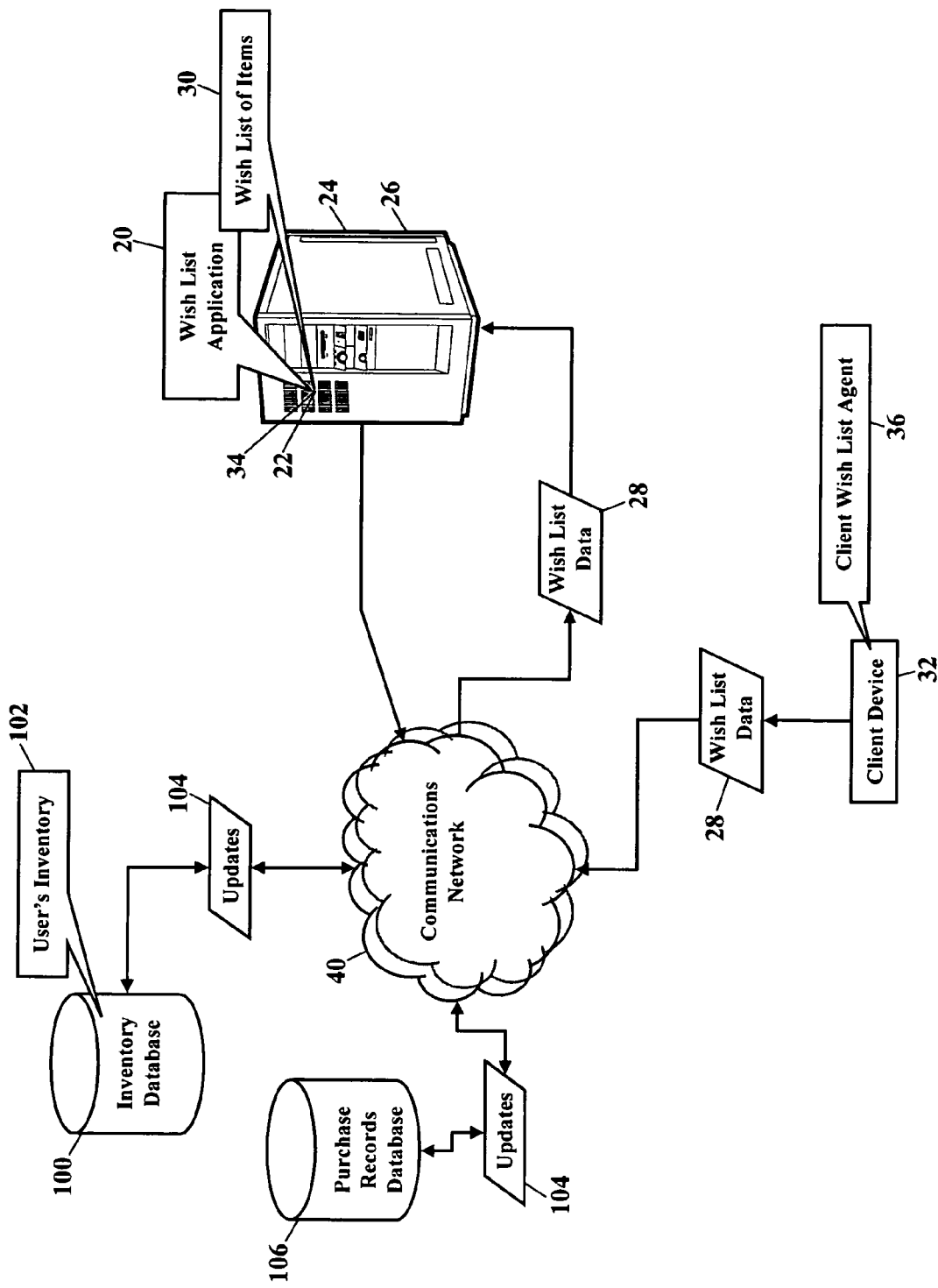
FIG. 7 is a schematic illustrating a personal inventory of products and services.

FIG. 7 is a schematic illustrating a personal inventory of products and services, according to even more aspects of the present invention. Here, as the wish list application 20 generates the wish list 30 of items, the wish list application 20 may consult an inventory database 100. The inventory database 100 stores information on what products, services, devices, and/or peripherals that the user already owns or has already received. The inventory database 100 may contain a comprehensive listing, or inventory 102, of the user's possessions, devices, and/or peripherals. The devices and/or peripherals could be detected and automatically added to the inventory database 100. The devices and/or peripherals may be detected by any means, such as radio frequency detection, messaging, and other wired and wireless means. The user may also use the client wish list agent 36 as an interface to the inventory database 100 and enter, or load, an inventory of personal possessions, devices, and peripherals. If the user already has a baseball bat, for example, and the user does not want another baseball bat, then the user may list "baseball bat" or other identifying term in the user's inventory 102. As the wish list application 20 generates the wish list 30 of items, the wish list application 20 will query the inventory 102 and, thus, not recommend another baseball bat. The user may thus enter into the inventory 102 any possession for which another is not needed.

The user, in fact, may enter into the inventory 102 any unwanted items. Not only may the inventory 102 contain existing possessions, but the inventory 102 may also contain items which are not wanted. If the user does not want the wish list application 20 to recommend socks or underwear, then the user may enter "socks," "underwear," or other identifying term in the user's inventory 102. As the wish list application 20 generates the wish list 30 of items, the wish list application 20 will query the inventory 102 and, thus, not recommend socks or underwear. The user may enter or load any items which are not desired, and the wish list application 20 may exclude those items from the wish list 30 of items.

The inventory 102 may also interface with purchase records. Recall the inventory 102 may contain a listing of the user's possessions. As the user makes purchases, then, the inventory 102 may be updated with those purchases. The inventory 102, then, may receive updates 104 from a purchase records database 106. The purchase records database 106 may be operated by a third party, such as a retailer or an online business. TARGET®, WAL-MART®, and SEARS®, for example, may update the user's inventory 102 any time a purchase is made from one of their stores. Likewise, EBAY® or AMAZON® may maintain the purchase records database 106 and send the update 104 any time the user makes a purchase from their website. A financial institution may also maintain records of credit card purchases, and the financial institution may send the update 104 any time the user makes a credit card purchase. Whatever the source, the updates 104 help maintain an accurate inventory of the user's possessions. The wish list application 20 may then remove any matching items from the user's wish list 30 of items. Because the user (or someone else) may have purchased that item, the purchased item is added to the inventory 102. The wish list application 20, then, may consult and/or query the inventory 102 to influence an update to the wish list 30 of items. The wish list application 20 may thus use the inventory 102 to help reduce redundant recommendations for products and services.

Figure 8:
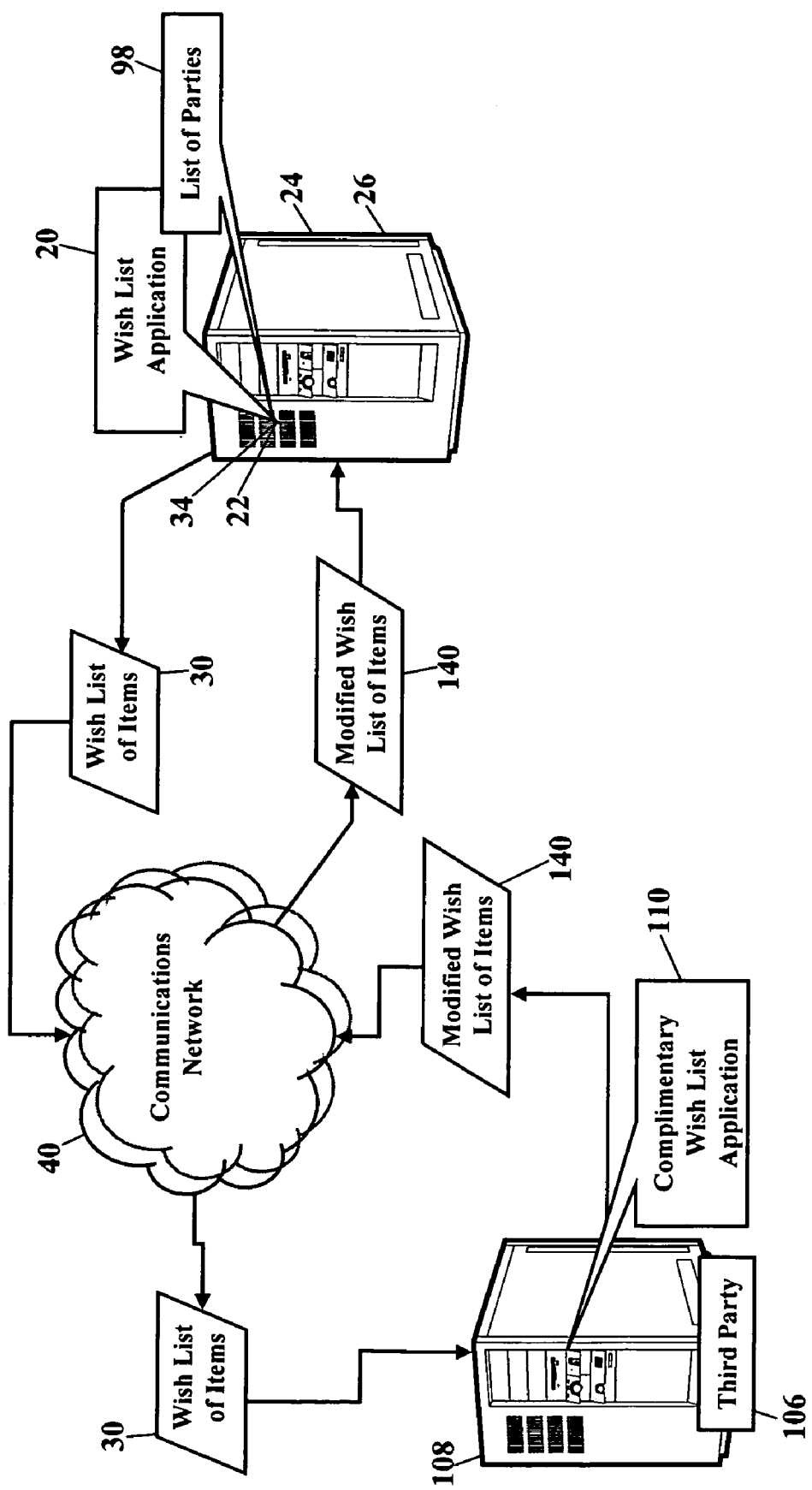
FIGS. 8 and 9 are more schematics illustrating third party placements.
Figure 9:
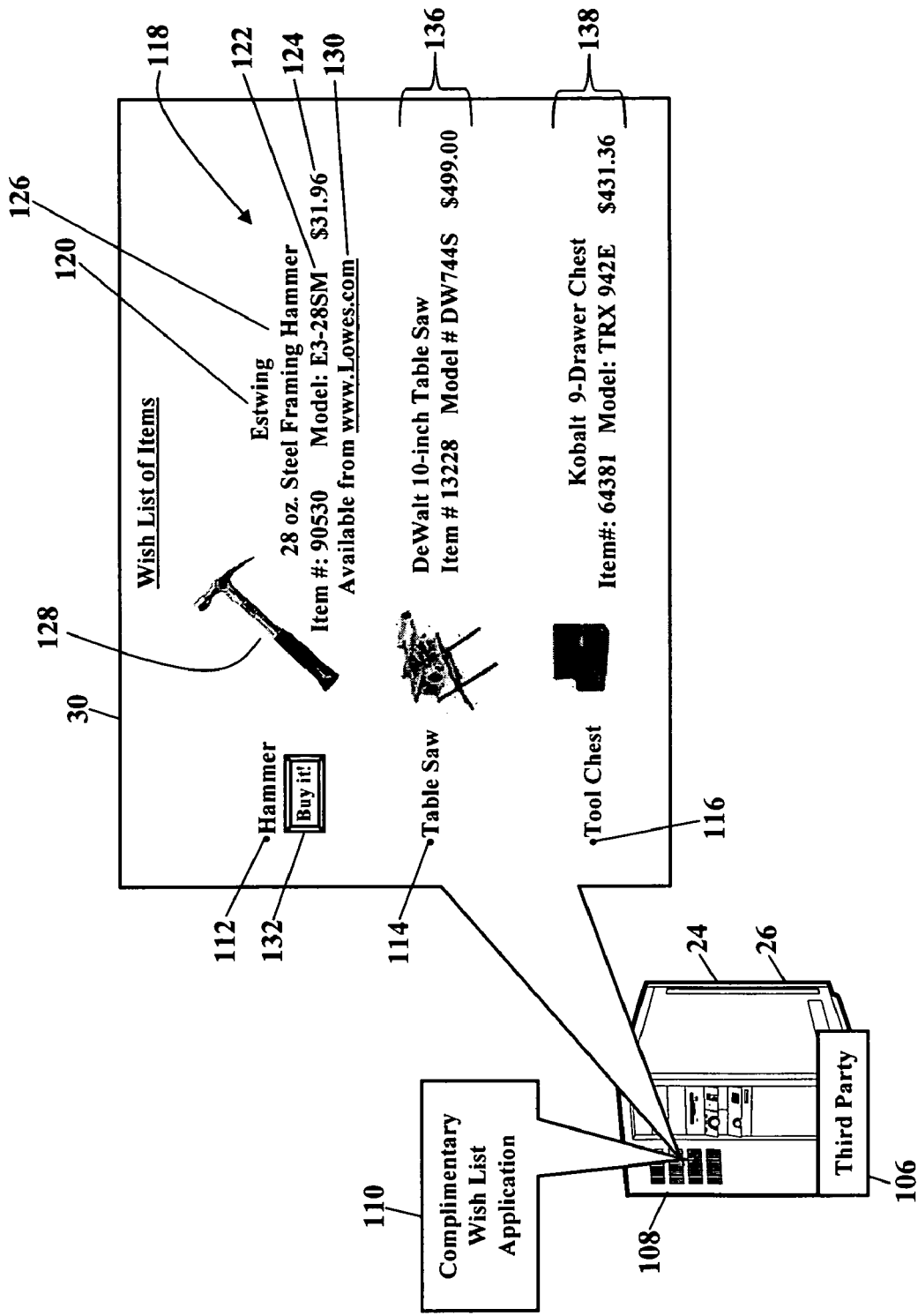

FIGS. 8 and 9 are more schematics illustrating third party placements, according to the present invention. Here, when the wish list application 20 generates the wish list 30 of items, the wish list application 20 may send that wish list 30 of items to a third party 106. The third party 106 may then match the user's wish list 30 of items against the third party's inventory of products and services. The third party 106, therefore, is able to suggest, or place, their own products and services to fulfill the user's wish list 30 of items. If, for example, the user's wish list 30 of items is sent to LOWES®, then that third party may compare their inventory of products and services to the generated wish list 30 of items. If the wish list 30 of items contains a "hammer," then LOWES® could suggest, or place, one of their hammers into the wish list 30 of items. LOWES® may scan the entire wish list 30 of items and place any products or services that may fulfill an item on the list. The wish list 30 of items, then, contains not only recommendations, but the wish list 30 of items may also contain actual product references to fulfill the recommendations.

The wish list application 20 may first consult the authorized list 98 of parties. Before the wish list application 20 sends the wish list 30 of items to the third party 106, the wish list application 20 may first access the list 98 of parties. Recall the list 98 of parties contains names, addresses, domains, or other identifiers of parties that are approved or authorized to receive the user's wish list 30 of items. Before the wish list application 20 sends the wish list 30 of items to the third party 106, the wish list application 20 may first ensure that the third party 106 is authorized to receive the wish list 30 of items. Before the user's wish list 30 of items is sent to LOWES®, for example, the wish list application 20 may first ensure that LOWES® is authorized to place their products into the wish list 30 of items. The user may thus determine what retailers, website operators, or other third parties have access to the user's wish list 30 of items.

The wish list application 20 sends the wish list 30 of items to the third party 106. The wish list 30 of items communicates via the communications network 40 to a communications address associated with the third party 106. FIG. 8 illustrates a third party server 108, associated with the third party 106, receiving the wish list 30 of items. The wish list 30 of items has any format that is acceptable to the third party 106. The wish list 30 of items, for example, may be an eXtensible Mark-up Language (XML) file or format. FIG. 8 illustrates the wish list 30 of items communicating to a complimentary wish list application 110 operating in the third party server 108. The complimentary wish list application 110 cooperates with the wish list application 20 to receive and to process the user's wish list 30 of items. When the third party 106 receives the wish list 30 of items, the third party 106 compares the user's wish list 30 of items to the third party's offering of products and/or services. The third party 106 is thus able to determine which of their products and services may match an item in the user's wish list 30 of items. The third party 106 may use any means to determine which of their products and services match an item in the user's wish list 30 of items. Whatever method is used, the third party 106 may then associate, insert, or place their own products or services into the user's wish list 30 of items.

FIG. 9 illustrates this placement. The user's wish list 30 of items comprises a listing, compilation, or organization of recommended products and/or services that may appeal to the user. FIG. 9, for example, illustrates the user's wish list 30 of items containing recommendations for a hammer 112, a table saw 114, and a tool chest 116. The wish list application 20, therefore, has determined, from all of the user's wish list data (shown as reference numeral 28 in FIGS. 1-7), that these products may appeal to the user. Suppose the wish list application 20 has then communicated the wish list 30 of items to an address or server destination associated with LOWES®. The third party retailer LOWES® then determines which of their products and services may match the items in the user's wish list 30 of items. Suppose, for example, LOWES® then determines that one of their framing hammers satisfies the recommended hammer 112. LOWES® may then insert a product identifier 118 into the user's wish list 30 of items. The product identifier 118 may be inserted at any position or location, and the product identifier 118 may even replace the generic recommendation for "hammer." LOWES® may even insert specific information, such as a brand or manufacturer 120, model number 122, pricing 124, and even a product description 126. LOWES® may also insert a picture 128 or other representation of their framing hammer, along with a link 130 to their website for purchasing their framing hammer. LOWES® may also insert a button 132 or other link to immediately purchase their framing hammer. LOWES® may also continue placing more products into the user's wish list 30 of items, such as placing product identifiers 134 and 136 for the respective table saw 114 and the tool chest 116.

Returning to FIG. 8, the third party 106 creates a modified wish list 140 of items. The modified wish list 140 of items contains the third party's product and service placements. The third party 106 then sends the modified wish list 140 of items from the third party server 108. Although the modified wish list 140 of items may be addressed to any destination, FIG. 8 illustrates the modified wish list 140 of items communicating via the communications network 40 to the computer server 26. The computer server 26 stores the modified wish list 140 of items in its memory 22, thus acting as a central repository for user wish lists.

Figure 10:
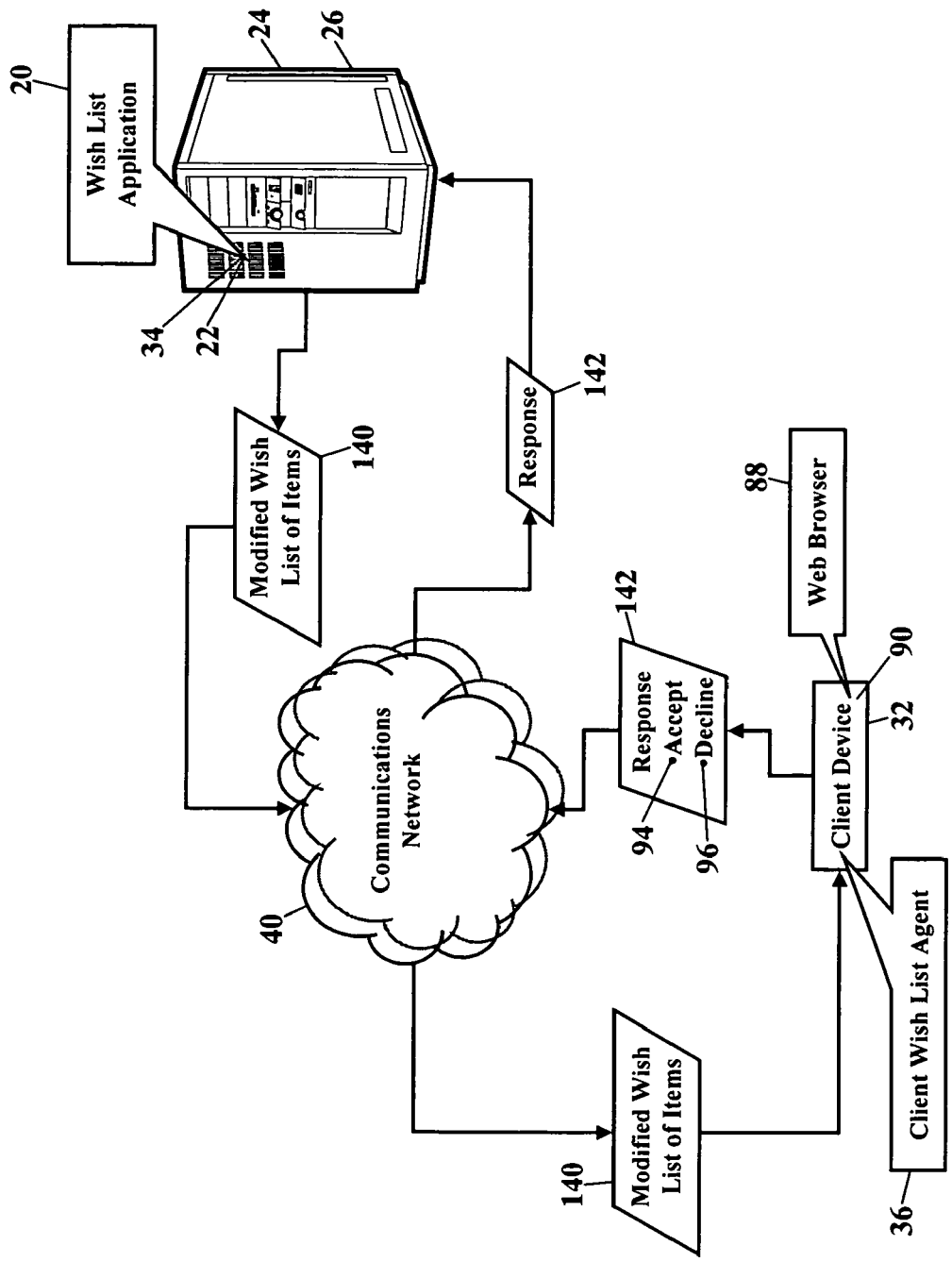
FIG. 10 is a schematic illustrating user review of a modified wish list of items.

FIG. 10 is another schematic illustrating user review of the modified wish list 140 of items, according to the present invention. FIG. 10 illustrates the wish list application 20 sending the modified wish list 140 of items to the user's client device 32. The user may invoke the web browser 88 (or other program) to visually or audibly present the modified wish list 140 of items. As the user reviews the modified wish list 140 of items, the user may approve, or decline, any product or service placement. The client wish list agent 36 then instructs the client processor 90 to send another response 142 to the wish list application 20. The response 142 again includes any request to approve 94 and/or decline 96 a third party's product or service placement. The response 142 communicates via the communications network 40 to the computer server 26. When the wish list application 20 receives the response 142, the wish list application 20 instructs the processor 90 to act on any request to approve 94 and/or decline 96 a third party's product or service placement. The wish list application 20 may also include logic, programming, and/or code that would influence future product placements by that third party. That is, if the user declines a third party's placement, then the wish list application 20 may disregard similar placements from that same third party. The wish list application 20, therefore, may again give the user an opportunity to say "no thanks" to third party placements.

Figure 11:
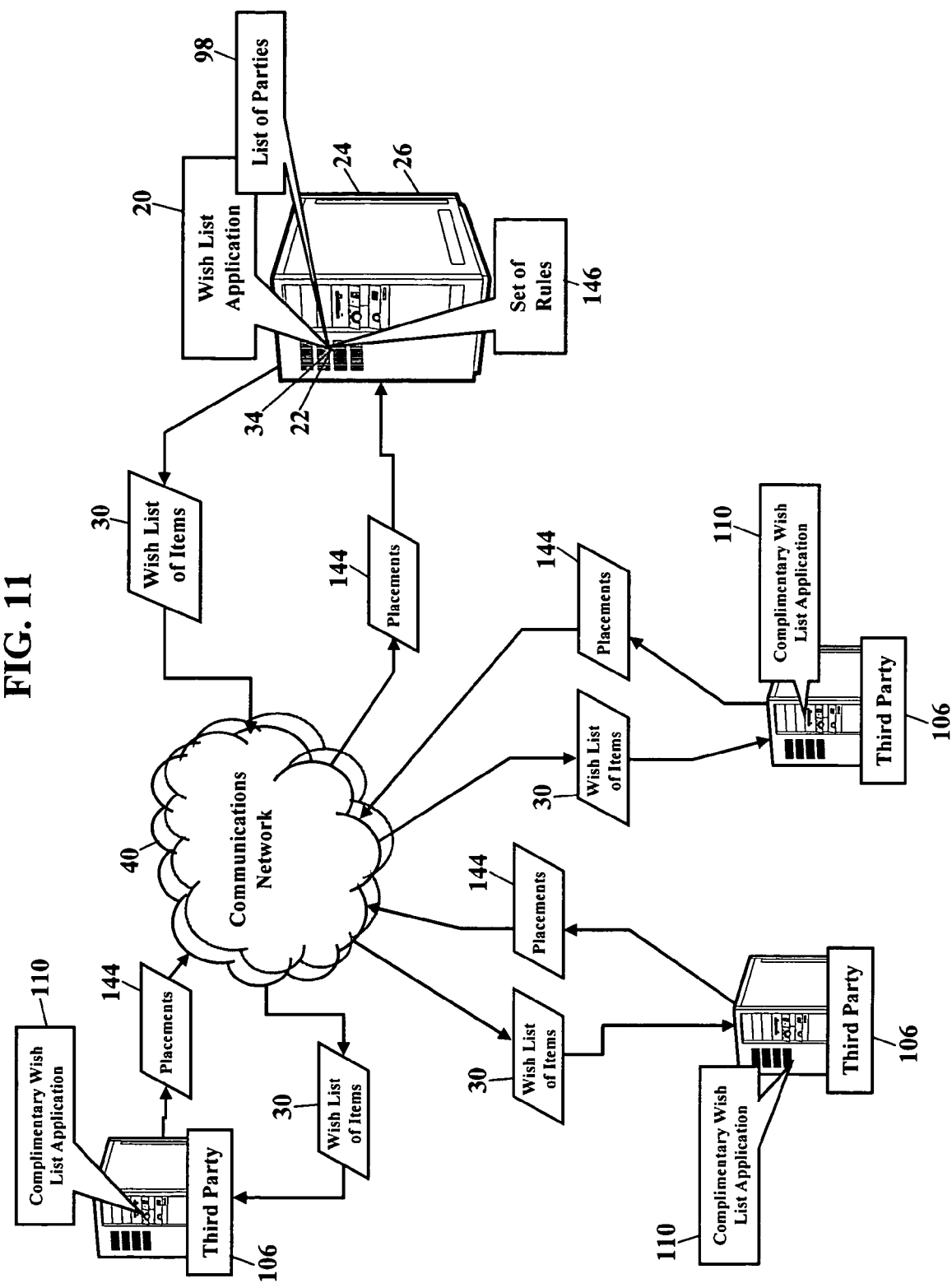
FIG. 11 is another schematic illustrating comparison placements.

FIG. 11 is another schematic illustrating comparison placements, according to more aspects of the present invention. Here the wish list application 20 sends the user's wish list 30 of items to multiple third parties. Each third party is given an opportunity to place their products or services into the user's wish list 30 of items. (Before the wish list application 20 sends the wish list 30 of items to the third party 106, the wish list application 20 may first ensure that the third party 106 is authorized to receive the wish list 30 of items by querying the list 98 of parties.) Each third party 106 may then send their own product/service placements 144 to the wish list application 20. The wish list application 20 then compares all the product placements 144 and selects the best placement for an individual item. Again, suppose HOME DEPOT®, LOWES®, and SEARS® all submit product placements to fulfill a "hammer" item in the user's wish list of items. The user may configure the wish list application 20 to include each third party's placement 144 in the user's wish list 30 of items. The user, however, may also configure the wish list application 20 to select the "best" placement. The user, for example, may establish a set 146 of rules that define how competing product placements are chosen. The user may establish comparison factors, such as price, feature(s), warranty, shipping, brand, and even store location, to determine which third party's placement is selected. The wish list application 20 may even conduct a reverse auction to determine which third party earns the placements. The wish list application 20, then, may serve as the user's personal agent or shopper, yet, with authority and logic to comparison shop.

Figure 12:
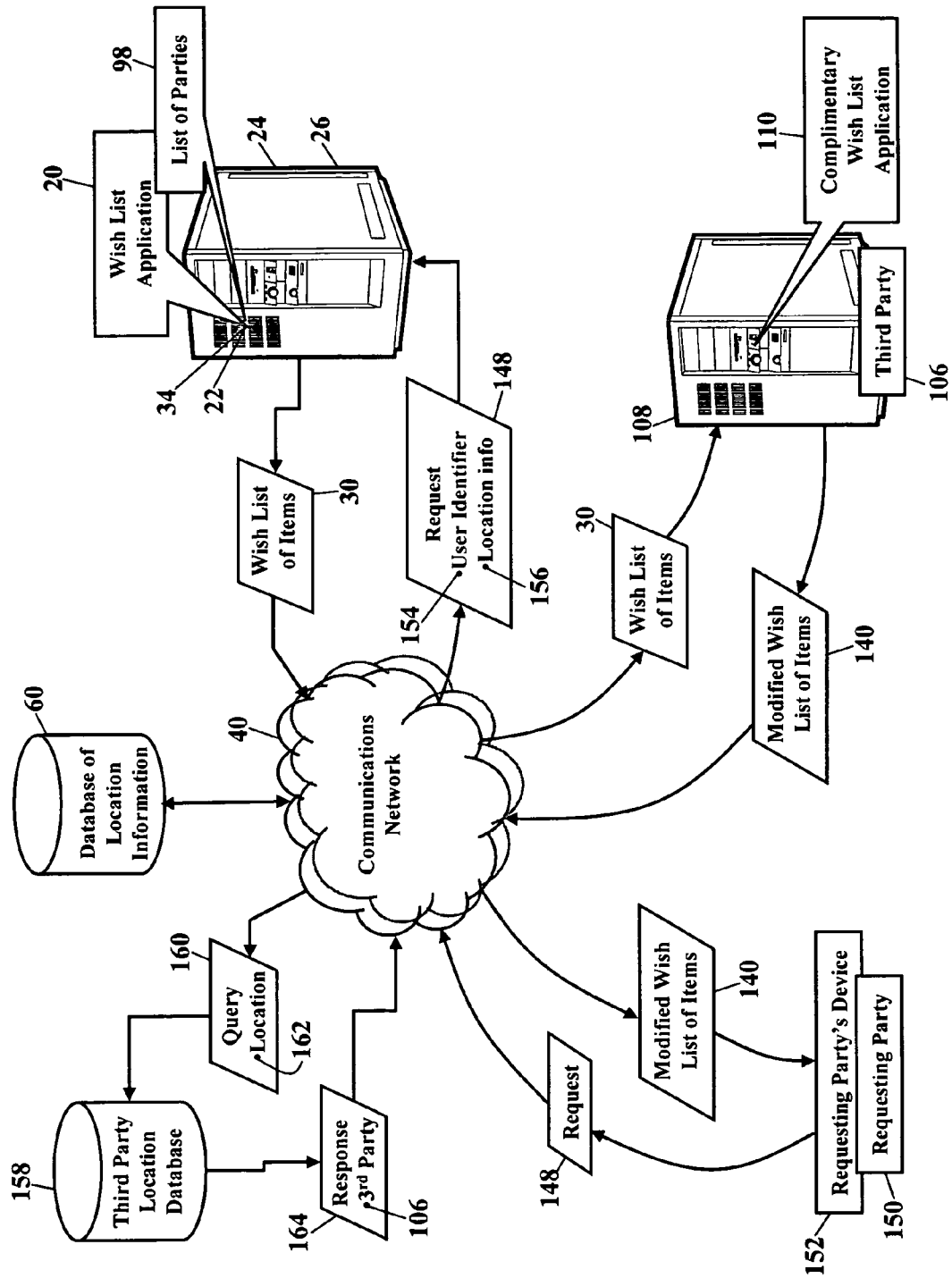
FIG. 12 is a schematic illustrating location-based placements.

FIG. 12 is a schematic illustrating location-based placements, according to still more aspects of the present invention. Here products are placed according to location. That is, when the wish list application 20 receives a request for the wish list 30 of items, the third party 106 is chosen based on location information associated with the request.

As FIG. 12 illustrates, a request 148 is received for the user's wish list 30 of items. The request 148, for example, may be received from a family member or friend who wishes to purchase a gift for the user. Generically, though, the request 148 is received from any requesting party 150. The request 148 communicates from the requesting party's device 152 and communicates via the communications network 40 to the computer server 26. The request 148 may include a user identifier 154 and location information 156. The user identifier 154 identifies the gift recipient (e.g., the user and, thus, the user's wish list 30 of items). The location information 154 represents a location of the requesting party's device 152. The location information 156 may be GPS coordinates, triangulation information, or any other information that may be used to derive or infer the location of the requesting party's device 152.

The wish list application 20 receives the request 148. When the request 148 is received, the wish list application 20 may first ensure that the requesting party 150, and/or their requesting device 152, is authorized to receive the user's wish list 30 of items. The wish list application 20 may access the list 98 of parties that are authorized to receive the wish list 30 of items (as explained with reference to FIG. 6). The wish list application 20 obtains the location information 156 and queries the database 60 of location information. The database 60 of location information may then return a current and/or historical location to the wish list application 20, and the location may represent a current or real-time location for the requesting party's device 152 (as the text accompanying FIG. 3 above explained).

The wish list application 20 may then obtain a third party that offers products and/or services in the vicinity of the requesting party's device 152. When the wish list application 20 obtains the location of the requesting party's device 152, the wish list application 20 knows the current location of the requesting party 150. Remember, again, that the request 148 has been received from a family member, friend, or other party presumably wishing to purchase a gift for the user. Remember also that the wish list application 20 also knows the requesting party's current location. The wish list application 20, then, may attempt to "place" products and services that minimize the requesting party's travel or shopping time. Suppose, for example, that the requesting party's device 152 is in the parking lot of a HOME DEPOT® store. The wish list application 20 may then send the user's wish list 30 of items to a server associated with HOME DEPOT®. The retailer HOME DEPOT® returns their product and service placements that match the items in the user's wish list 30 of items. When the user's wish list 30 of items is then sent to the requesting party 150, the wish list 30 of items is populated with HOME DEPOT® items. So, as the requesting party 150 enters the HOME DEPOT® store, the requesting party 150 is immediately provided relevant gift suggestions from the HOME DEPOT® store. The requesting party 150, then, may quickly purchase a gift from user's wish list 30 of items.

The wish list application 20, however, must first obtain the third party 106 in the vicinity of the requesting party's device 152. Because the database 60 of location information has provided the current or real-time location of the requesting party's device 152, the wish list application 20 need only obtain a third party 106 in that vicinity. The wish list application 20 may query a third party location database 158. This third party location database 158 maps third parties to location. When the wish list application 20 sends a query 160 to the third party location database 158, the query 160 includes the location 162 of the requesting party's device 152. The third party location database 158 then returns a response 164, and the response 164 includes one or more third parties 106 in the vicinity of the location 162 of the requesting party's device 152. The third party location database 158 preferably is populated with fine resolution data, such that a single third party 106 is mapped to the location 162 of the requesting party's device 152. If, however, multiple third parties are mapped to the location 162, then a sponsorship agreement may again determine which third party gets preference. The wish list application 20 may additionally eliminate some third parties by accessing the list 98 of parties. If a third party is not authorized to receive the user's wish list 30 of items, then that unauthorized third party may be removed from consideration.

The wish list application 20 then places items in the user's wish list. Once the third party 106 has been associated with the location 162 of the requesting party's device 152, the wish list application 20 sends the user's wish list 30 of items to the server 108 associated with the third party 106. The third party 106 returns the modified wish list 140 of items, and the modified wish list 140 of items includes the third party's product and service placements that match the items in the user's wish list 30 of items (as the text accompanying FIGS. 8 and 9 above explained). The wish list application 20 sends the modified wish list 140 of items to the requesting party's device 152, and the modified wish list 140 of items is populated with the third party's items. Returning again to the above example, if the requesting party's device 152 is in the parking lot of a HOME DEPOT® store, then the modified wish list 140 of items may be populated with HOME DEPOT® items. As the requesting party 150 enters the HOME DEPOT® store, the requesting party 150 is immediately provided with gift suggestions that may be purchased from the HOME DEPOT® store.

Figure 13:
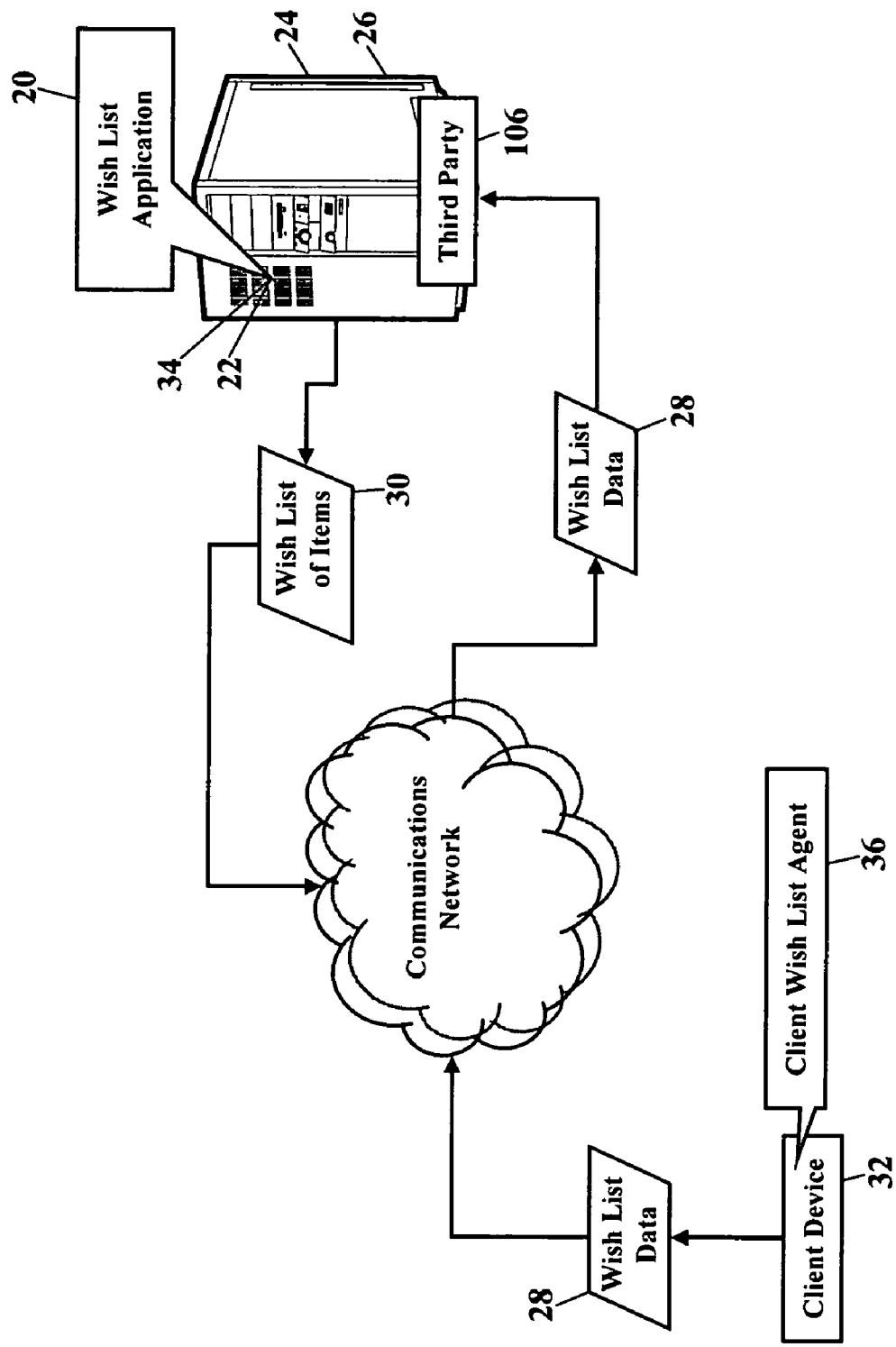
FIG. 13 is a schematic illustrating third party portal access to a computer server.

FIG. 13 is a schematic illustrating third party operation of the computer server 26, according to additional aspects of the present invention. Here the computer server 26 is operated by, or maintained on behalf of, the third party 106. The wish list application 20, then, generates the user's wish list 30 of items using the third party's products and services. Suppose, for example, that the wish list application 20 is offered on behalf of AMAZON®. The e-commerce website www.amazon.com, then, may offer a portal or other link to the wish list application 20. The user downloads or otherwise obtains the client wish list agent 36. The client wish list agent 36 then collects the wish list data 28 and sends that data to AMAZON®. The wish list application 20 then generates the user's wish list 30 of items. The wish list application 20, however, populates the user's wish list 30 of items with AMAZON® products and services. That is, AMAZON® populates or places their own products and services, or those of their affiliates, into the user's wish list 30 of items. AMAZON® thus offers the wish list application 20 as perhaps an exclusive feature for their customers. AMAZON® may even offer incentives to use the wish list application 20.

Figure 14:
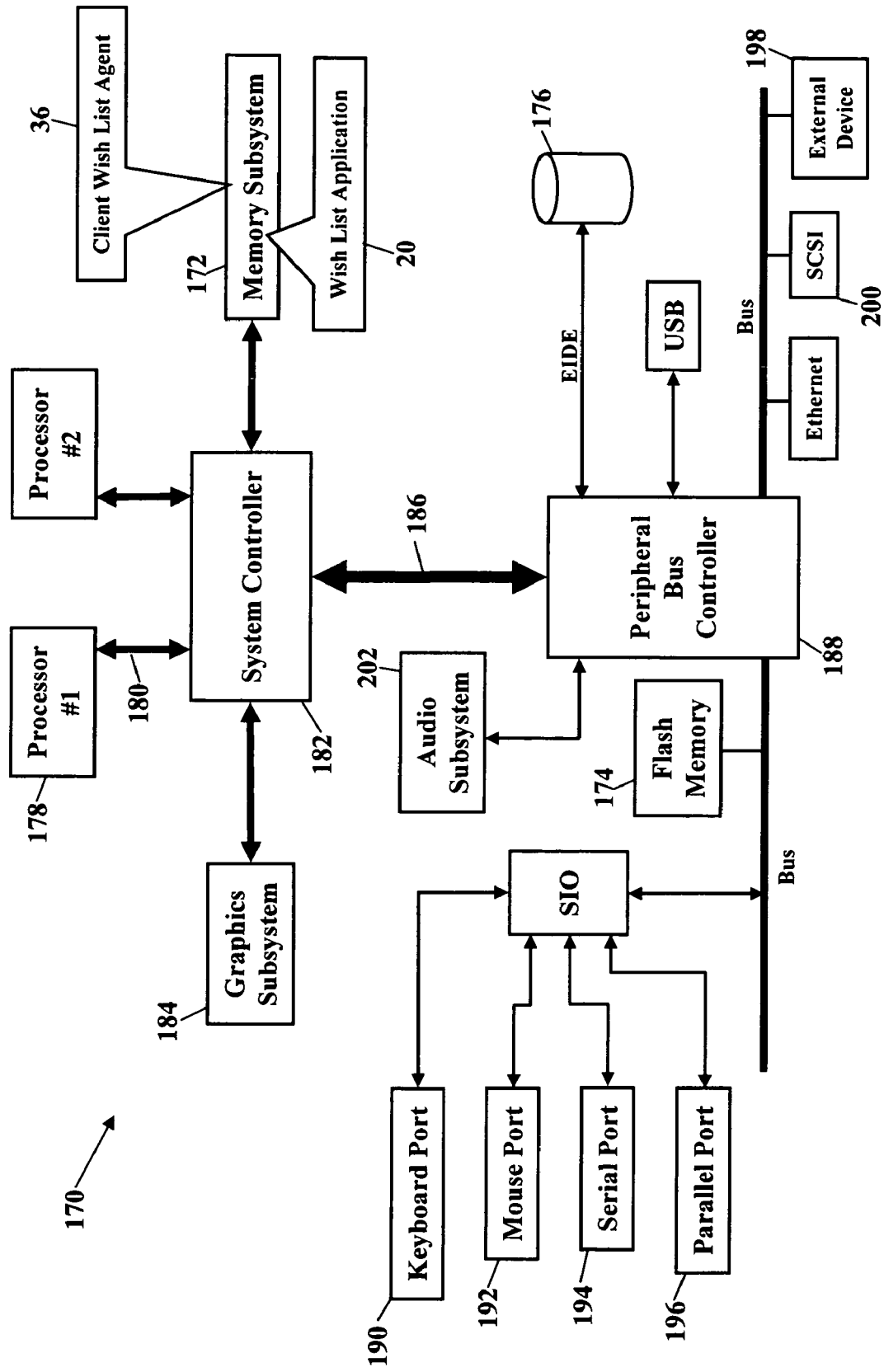
FIG. 14 depicts another possible operating environment.

FIG. 14 depicts another possible operating environment for additional aspects of the present invention. FIG. 14 is a block diagram showing the wish list application 20 and the client wish list agent 36 residing in a processor-controlled system 170 (such as the computer server 26, the client device 32, or the third party server 108). FIG. 14, however, may also represent a block diagram of any computer or communications device in which the wish list application 20 or the client wish list agent 36 may operate. The wish list application 20 or the client wish list agent 36 operates within a system memory device. The wish list application 20 or the client wish list agent 36, for example, is shown residing in a memory subsystem 172. The wish list application 20 or the client wish list agent 36, however, could also reside in flash memory 174 or peripheral storage device 176. The computer system 170 also has one or more central processors 178 executing an operating system. The operating system, as is well known, has a set of instructions that control the internal functions of the computer system 170. A system bus 180 communicates signals, such as data signals, control signals, and address signals, between the central processor 178 and a system controller 182. The system controller 182 provides a bridging function between the one or more central processors 178, a graphics subsystem 184, the memory subsystem 172, and a PCI (Peripheral Controller Interface) bus 186. The PCI bus 186 is controlled by a Peripheral Bus Controller 188. The Peripheral Bus Controller 188 is an integrated circuit that serves as an input/output hub for various peripheral ports. These peripheral ports could include, for example, a keyboard port 190, a mouse port 192, a serial port 194, and/or a parallel port 196 for a video display unit, one or more external device ports 198, and external hard drive ports 200 (such as IDE, ATA, SATA, or SCSI). The Peripheral Bus Controller 188 could also include an audio subsystem 202. Those of ordinary skill in the art understand that the program, processes, methods, and systems described herein are not limited to any particular computer system or computer hardware.

One example of the central processor 178 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

Any operating system may be used. Any of the WINDOWS® operating systems, for example, may be suitable (WINDOWS® is a registered trademark of Microsoft Corporation, One Microsoft Way, Redmond Wash. 98052-6399, 425.882.8080, www.Microsoft.com). Other operating systems would include the UNIX® operating system (UNIX® is a registered trademark of the Open Source Group, www.opensource.org), the UNIX-based Linux operating system, WINDOWS NT®, and MAC® OS (Mac® is a registered trademark of Apple Computer, Inc., 1 Infinite Loop, Cupertino, Calif. 95014, 408.996.1010, www.apple.com). Other operating systems could also include any of the PALM® Operating Systems available from PalmSource, Inc., 1188 East Argues Avenue, Sunnyvale, Calif. 94085 and any of the BLACKBERRY® desktop software applications, handheld software applications, and server applications available from Research In Motion Limited. Those of ordinary skill in the art again understand that the program, processes, methods, and systems described herein are not limited to any particular operating system.

The system memory device (shown as memory subsystem 172, flash memory 174, or peripheral storage device 176) may also contain an application program. The application program cooperates with the operating system and with a video display unit (via the serial port 194 and/or the parallel port 196) to provide a Graphical User Interface (GUI). The Graphical User Interface typically includes a combination of signals communicated along the keyboard port 190 and the mouse port 192. The Graphical User Interface provides a convenient visual and/or audible interface with a user of the computer system 170.

Figure 15:
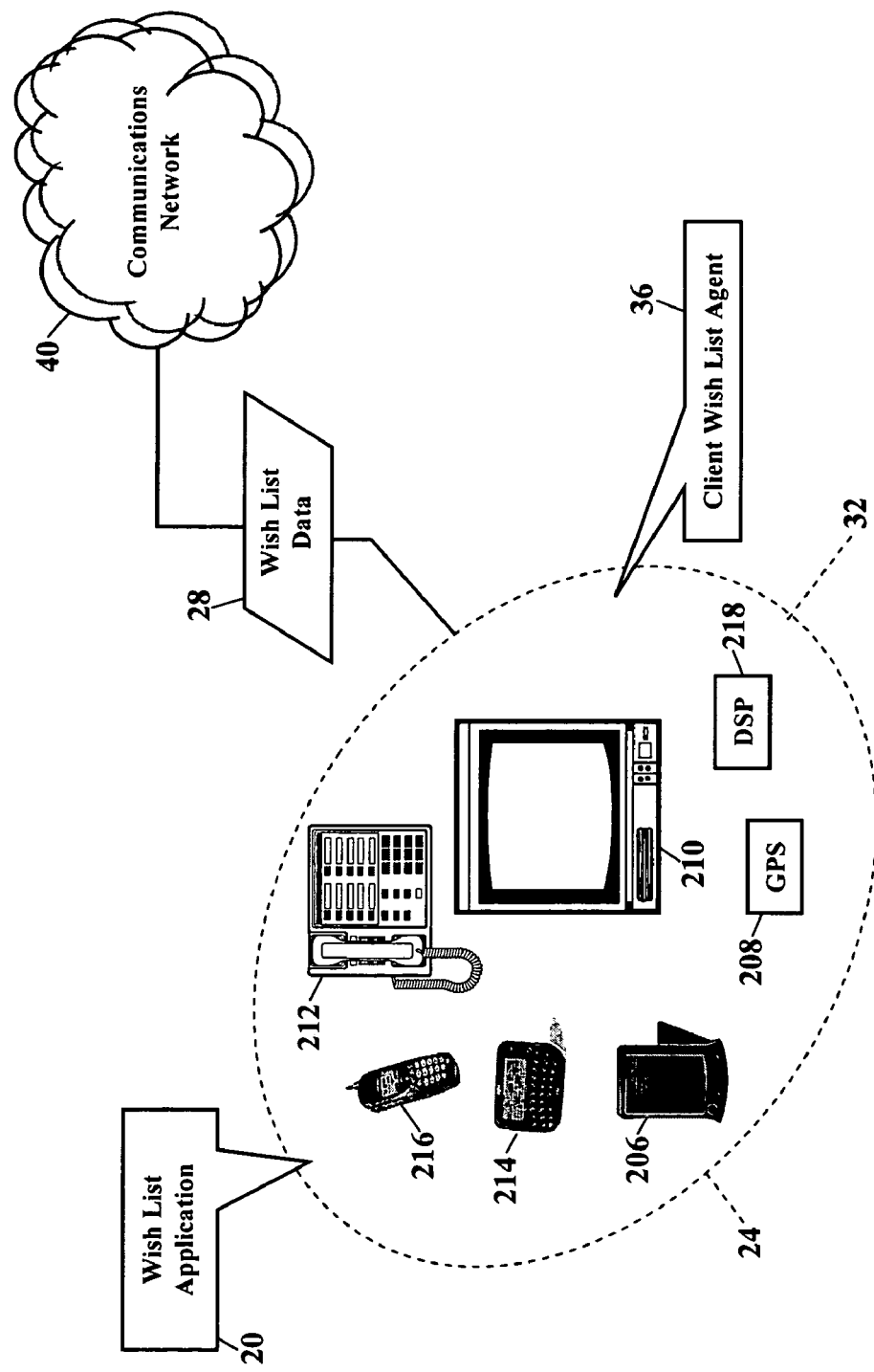

FIG. 15 is a schematic illustrating still more exemplary embodiments. FIG. 15 illustrates that the wish list application 20 or the client wish list agent 36 may alternatively or additionally operate within various other communications devices 24. FIG. 15, for example, illustrates that the wish list application 20 or the client wish list agent 36 may entirely or partially operate within a personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 24 may also include watches, radios, vehicle electronics, clocks, printers, gateways, and other apparatuses and systems.

Figure 16:
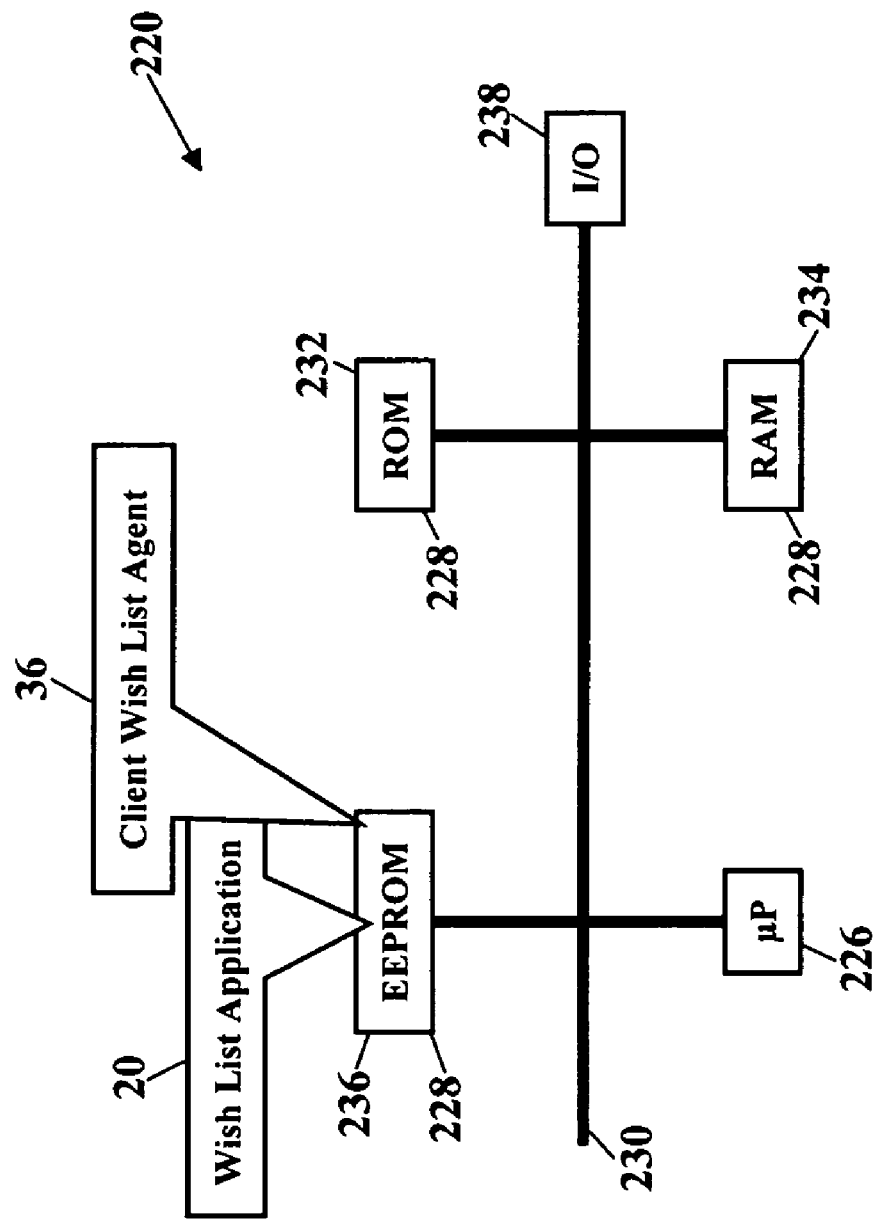

FIGS. 16-18 are schematics further illustrating various other communications devices for generating wish lists, according to the present invention. FIG. 16 is a block diagram of a Subscriber Identity Module 220, while FIGS. 17 and 18 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many communications devices (such as the communications devices shown in FIGS. 14 and 15). The Subscriber Identity Module 220 stores subscriber information (such as the subscriber's International Mobile Subscriber Identity, the subscriber's $K_i$ number, and other subscriber information), perhaps the subscriber's profile (shown as reference numeral 108), and any portion of the wish list application 20 or the client wish list agent 36. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment* (*Subscriber Identity Module— ME*) *interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 16 is a block diagram of the Subscriber Identity Module 220, whether embodied as the plug 222 of FIG. 17 or as the card 224 of FIG. 18. Here the Subscriber Identity Module 220 comprises a microprocessor 226 (μP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the wish list application 20 or the client wish list agent 36 in one or more of the memory modules 228. FIG. 16 shows the wish list application 20 or the client wish list agent 36 residing in the Erasable-Programmable Read Only Memory 236, yet either could alternatively or additionally reside in the Read Only Memory 232 and/or the Random Access/Flash Memory 234. An Input/Output module 238 handles communication between the Subscriber Identity Module 220 and the communications device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 19:
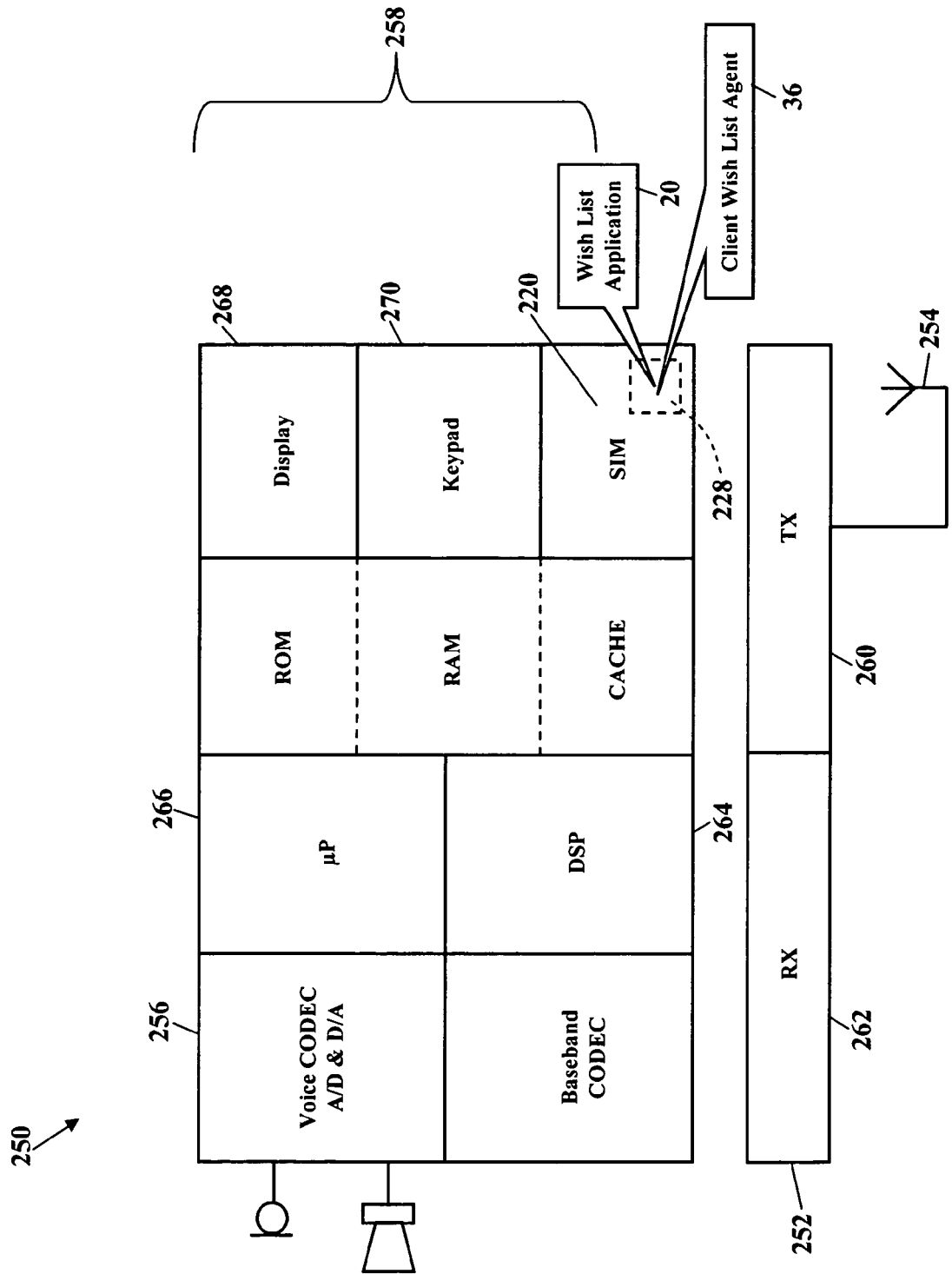

FIG. 19 is a schematic further illustrating various communications devices for generating wish lists, according to the present invention. FIG. 19 is a block diagram of another communications device 250 utilizing any portion of the wish list application 20. In one embodiment, the communications device 250 comprises a transceiver unit 252, an antenna 254, a digital baseband chipset 256, and a man/machine interface (MMI) 258. The transceiver unit 252 includes transmitter circuitry 260 and receiver circuitry 262 for receiving and transmitting electromagnetic signals of any frequency. The transceiver unit 252 couples to the antenna 254 for converting electrical current to and from electromagnetic waves. The digital baseband chipset 256 contains a digital signal processor (DSP) 264 and performs signal processing functions. As FIG. 19 shows, the digital baseband chipset 256 may also include an on-board microprocessor 266 that interacts with the man/machine interface (MMI) 258. The man/machine interface (MMI) 258 may comprise a display device 268, a keypad 270, and/or the Subscriber Identity Module 220. The on-board microprocessor 266 performs control functions for the radio circuitry 260 and 262, for the display device 268, and for the keypad 270. The on-board microprocessor 266 may also interface with the Subscriber Identity Module 220 and with the wish list application 20 or the client wish list agent 36 residing in the memory module 228 of the Subscriber Identity Module 220. Those skilled in the art will appreciate that there may be many suitable architectural configurations for the elements of the communications device 250. The componentry and operating principles for the communications device 250 are well understood and, thus, not further described.

The wish list application and the client wish list agent (shown, respectively, as reference numerals 20 and 36 in FIGS. 1-19) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the present invention to be easily disseminated. A computer program product comprises the wish list application 20 or the client wish list agent 36 stored on the computer-readable medium. The wish list application 20 or the client wish list agent 36 comprises computer-readable instructions/code for generating wish lists, as hereinabove explained. The wish list application 20 or the client wish list agent 36 may also be physically embodied on or in any addressable (e.g., HTTP, I.E.E.E. 802.11, Wireless Application Protocol (WAP), or BLUETOOTH®) wireless device capable of presenting an IP address.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A processor-implemented method of generating a wish list of items, comprising:

receiving, by a computer comprising a wish list application executable thereon, wish list data associated with a first user;

receiving, by the computer, a request for the wish list of items from a mobile user device associated with a second user, the wish list of items associated with the wish list data associated with the first user;

determining, by the computer, a current location of the mobile user device associated with the second user;

determining a second location of a second mobile device associated with the first user;

determining a public venue corresponding to the second location; and identifying, by the computer, a third party in a vicinity of the current location of the mobile user device associated with the second user;

generating, by the computer, the wish list of items based on the wish list data and the identified third party, wherein at least some of the items are products sold by the third party and at least one item is based on the public venue; and sending, by the computer, the wish list of items to the mobile user device associated with the second user.

2. A method according to claim 1, wherein the public venue comprises a sports venue, and wherein the at least one item comprises a sports-related item.

3. A method according to claim 1, further comprising receiving a request to decline an entry in the wish list of items and updating the wish list of items based on the request.

4. A method according to claim 1, further comprising accessing an inventory for the first user, such that when a request is received to remove an item from the wish list of items, the item is added to the inventory, and updating the wish list of items based on the inventory.

5. A method according to claim 1, further comprising accessing a list of parties that are authorized to receive the wish list of items and selecting the third party from the list.

6. A system for generating a wish list of items, comprising:
a wish list application stored in memory; and
a processor communicating with the memory, the system configured for:
receiving wish list data associated with a first user;
receiving a request for a wish list of items associated with the first user from a mobile user device associated with a second user, the wish list of items associated with the wish list data associated with the first user;
determining a current location of the mobile user device associated with the second user;
determining a second location of a second mobile device associated with the first user;
determining a public venue corresponding to the second location; and
identifying a third party in a vicinity of the current location of the mobile user device, generating the wish list of items based on the wish list data and the identified third party, wherein at least some of the items are products sold by the third party and at least one item is based on the public venue; and
sending the wish list of items to the mobile user device.

7. A system according to claim 6, wherein the public venue comprises a sports venue, and wherein the at least one item comprises a sports-related item.

8. A system according to claim 6, wherein the processor receives a request to decline an entry in the wish list of items and updates the wish list of items based on the request.

9. A system according to claim 6, wherein the processor accesses an inventory for the first user, such that when a request is received to remove an item from the wish list of items, the item is added to the inventory, and the wish list of items is updated based on the inventory.

10. A system according to claim 6, wherein the processor accesses a list of parties that are authorized to receive the wish list of items and selects the third party from the list.

11. A system according to claim 6, wherein the processor receives a request for a wish list of items and, based on location information associated with the request, selects the third party that matches the location information.

12. A computer program product comprising a computer-readable medium storing instructions for generating a wish list by performing the steps:
receiving, by a computer comprising a wish list application executable thereon, wish list data associated with a first user;
receiving, by the computer, a request for the wish list of items from a mobile user device associated with a second user, the wish list of items associated with the wish list data associated with the first user;
determining, by the computer, a current location of the mobile user device associated with the second user;
determining a second location of a second mobile device associated with the first user;
determining a public venue corresponding to the second location; and
identifying, by the computer, a third party in a vicinity of the current location of the mobile user device associated with the second user;
generating, by the computer, the wish list of items based on the wish list data and the identified third party, wherein at least some of the items are products sold by the third party and at least one item is based on the public venue; and
sending, by the computer, the wish list of items to the mobile user device.

13. A computer program product according to claim 12, wherein the public venue comprises a sports venue, and wherein the at least one item comprises a sports-related item.

14. A computer program product according to claim 12, further comprising instructions for receiving a request to decline an entry in the wish list of items and updating the wish list of items based on the request.

15. A computer program product according to claim 12, further comprising instructions for accessing an inventory for the first user, such that when a request is received to remove an item from the wish list of items, the item is added to the inventory, and updating the wish list of items based on the request.

16. A computer program product according to claim 12, further comprising instructions for accessing a list of parties that are authorized to receive the wish list of items and selecting the third party from the list.

17. A processor-implemented method of generating a wish list of items, comprising:
receiving, by a computer comprising a wish list application executable thereon, wish list data associated with a first user;
generating, by the computer, the wish list of items based on the wish list data;
receiving, by the computer, a request for the wish list of items from a mobile user device associated with a second user;
determining, by the computer, a current location of the mobile user device associated with the second user;
determining a second location of a second mobile device associated with the first user;
determining a public venue corresponding to the second location; and
identifying, by the computer, a third party in a vicinity of the location of the mobile user device associated with the second user;
sending, by the computer, the wish list of items to the identified third party;
receiving, by the computer, a placement from the identified third party, the placement identifying a product or service offered by the identified third party that matches at least one of the items on the wish list of items; and
sending, by the computer, the wish list of items and the placement to the mobile user device, wherein at least one item on the wish list of items is based on the public venue.

* * * * *